United States Patent [19]

Chiba et al.

[11] Patent Number: 5,896,250

[45] Date of Patent: Apr. 20, 1999

[54] HEAD TRANSPORT MECHANISM FOR DISC DRIVE APPARATUS

[75] Inventors: Jun Chiba; Takashi Nakai, both of Fukushima-ken, Japan

[73] Assignee: Alps Electric Co., Ltd., Japan

[21] Appl. No.: 08/971,943

[22] Filed: Nov. 17, 1997

[30] Foreign Application Priority Data

Nov. 19, 1996 [JP] Japan ................................. 8-308314
May 12, 1997 [JP] Japan ................................. 9-121049

[51] Int. Cl.$^6$ ........................... G11B 5/55; G11B 21/08
[52] U.S. Cl. ................................................. 360/106
[58] Field of Search ............................ 360/106, 105, 360/107

[56] References Cited

U.S. PATENT DOCUMENTS

| | | | |
|---|---|---|---|
| 4,992,684 | 2/1991 | Matsui | 360/106 X |
| 5,130,873 | 7/1992 | Yumura et al. | 360/106 |
| 5,136,446 | 8/1992 | Yamamoto et al. | 360/106 |
| 5,138,605 | 8/1992 | Shtipelman et al. | 369/215 |
| 5,818,666 | 10/1998 | Chaya | 360/106 |

FOREIGN PATENT DOCUMENTS 1-61877  3/1989  Japan .

*Primary Examiner*—John H. Wolff
*Attorney, Agent, or Firm*—Brinks Hofer Gilson & Lione

[57] ABSTRACT

A head transport mechanism for reciprocating a carriage in a radial direction of a disc using a linear motor as a drive source is disclosed. In the head transport mechanism, cylindrical projections are formed on a support plate, threads are cut on the inner surfaces of the projections, and cutouts are formed in the distal ends of bottom yokes. The cutouts are brought into contact with the outer peripheral surfaces of the projections so as to locate the bottom yoke. In addition, protrusions protruding outward from superposed portions of the bottom yokes and top yokes in a longitudinal and/or lateral direction of the bottom yokes are formed in at least one end of each of the bottom yokes so that the top yokes can be assembled with the protrusions pressed when assembling the head transport mechanism.

7 Claims, 24 Drawing Sheets

HEAD TRANSPORT MECHANISM FOR DISC DRIVE APPARATUS

BACKGROUND OF THE INVENTION

1. Field of the Invention

The present invention relates to a head transport mechanism included in disc drive apparatuses, and more particularly, to a head transport mechanism for reciprocating a carriage in a radial direction of a disc using a linear motor as a drive source.

2. Description of the Related Art

For example, in a magnetic recording/reproducing apparatus for recording/reproducing information of a magnetic disc contained in a disc cartridge, a head transport mechanism for reciprocating a carriage in a radial direction of the magnetic disc is included. During the recording/reproducing, when the carriage is operated using a motor as a drive source, a magnetic head mounted on the carriage is reciprocated in the radial direction of the rotating magnetic disc.

Hitherto, a head transport mechanism using a linear motor as a drive source has been proposed, as disclosed in Japanese Unexamined Utility Model Publication No. 1-61877. In such a head transport mechanism, the linear motor is composed of yokes combining I-shaped yokes with U-shaped yokes, magnets fixed on the inner surface of the U-shaped yokes, and exciting coils disposed around the I-shaped yokes. Components of the yokes constituting a magnetic circuit of the linear motor are fixed on a support plate. Guide shafts are mounted to the support plate, a carriage having a head is guided by the guide shafts, and the exciting coils of the linear motor are fixed to both sides of the carriage.

In the thus constructed head transport mechanism, since propulsive force responsive to a direction of current flowing in the exciting coils is generated, the current flowing in the exciting coil is controlled, whereby the carriage is reciprocated in the radial direction of a disc along the guide shafts, so that information of the disc is recorded/reproduced by the head mounted on the carriage.

In the conventional head transport mechanism using the linear motor as the drive source, assembly steps are usually adopted such that the I-shaped yokes are inserted into the exciting coils fixed to the carriage after installing the carriage on the guide shafts and thereafter, the components of the magnetic circuit, including the I-shaped yoke, are secured on the support plate by screws.

However, since the head transport mechanism is disposed within a main chassis together with other components and the main chassis does not have enough space as is generally known, it is very difficult to adjust the I-shaped yokes to predetermined positions where they are secured by screws. In addition, when mounting the U-shaped yoke having magnets fixed on inner surfaces thereof, the I-shaped yokes are attracted by the magnets toward the U-shaped yokes so as to be brought into contact with the exciting coils, so that the exciting coils may be damaged.

In addition, when inserting the I-shaped yokes into the exciting coils, the exciting coils may be brought into contact with the I-shaped yoke and be damaged unless a lot of attention is paid. Thus, workability deteriorates.

SUMMARY OF THE INVENTION

It is therefore an object of the present invention to provide a head transport mechanism for a disc drive apparatus in which components of a linear motor are easily assembled without damaging exciting coils.

According to an aspect of the present invention, there is provided a head transport mechanism for a disc drive apparatus, including: guide shafts attached to a support plate, a carriage reciprocated along the guide shafts in a radial direction of a disc, exciting coils fixed to the carriage, bottom yokes inserted into the exciting coils, top yokes placed on the bottom yokes, magnets fixed to the top yokes, and set screws for securing the bottom yokes and top yokes to the support plate, wherein cylindrical projections are formed on the support plate, threads with which the set screws are threadedly engaged are cut on inner surfaces of the projections, and cutouts abutting with the projections are formed in one end of each of the bottom yokes.

According to another aspect of the present invention, there is provided a head transport mechanism for a disc drive apparatus, including: guide shafts attached to a support plate, a carriage reciprocated along the guide shafts in a radial direction of a disc, exciting coils fixed to the carriage, bottom yokes inserted into the exciting coils; top yokes placed on the bottom yokes, magnets fixed to the top yokes, and set screws for securing the bottom yokes and top yokes to the support plate, wherein, in the vicinity of the set screws for overlapping and securing the bottom yokes and the top yokes, protrusions protruding outward from overlapping portions in a longitudinal and/or lateral direction of the bottom yokes are formed in at least one end of each of the bottom yokes.

DESCRIPTION OF THE PREFERRED EMBODIMENTS

The preferred embodiments will be described with reference to the accompanying drawings.

Figure 1:
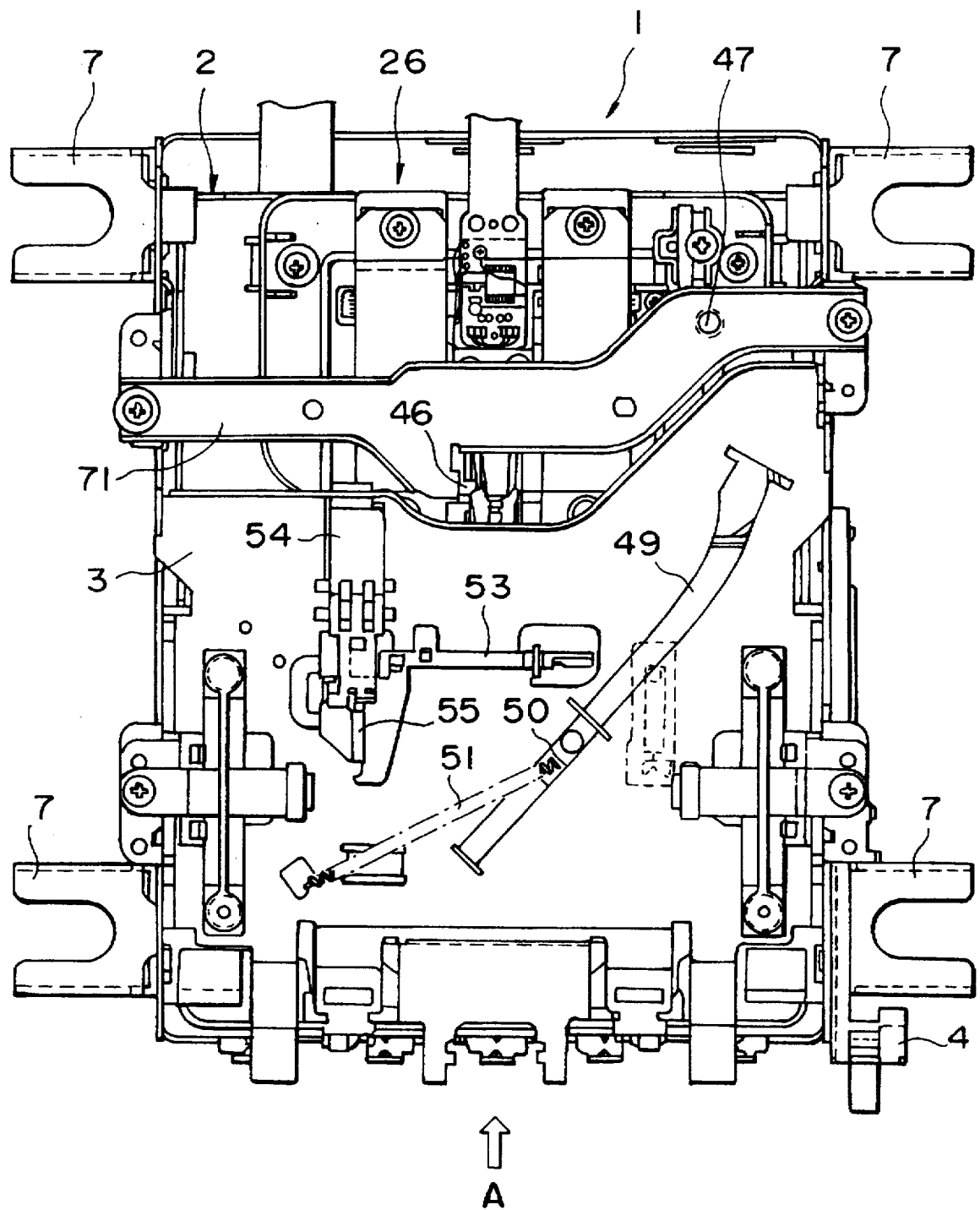
FIG. 1 is a plan view of a magnetic recording/reproducing apparatus according to a first embodiment of the present invention.
Figure 2:
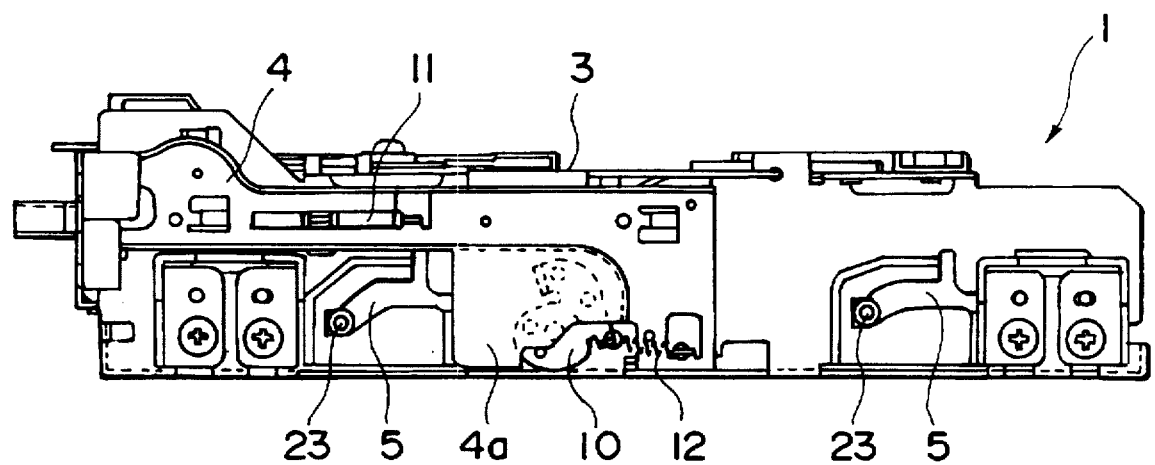
FIG. 2 is a right-hand side view of the magnetic recording/reproducing apparatus.
Figure 3:
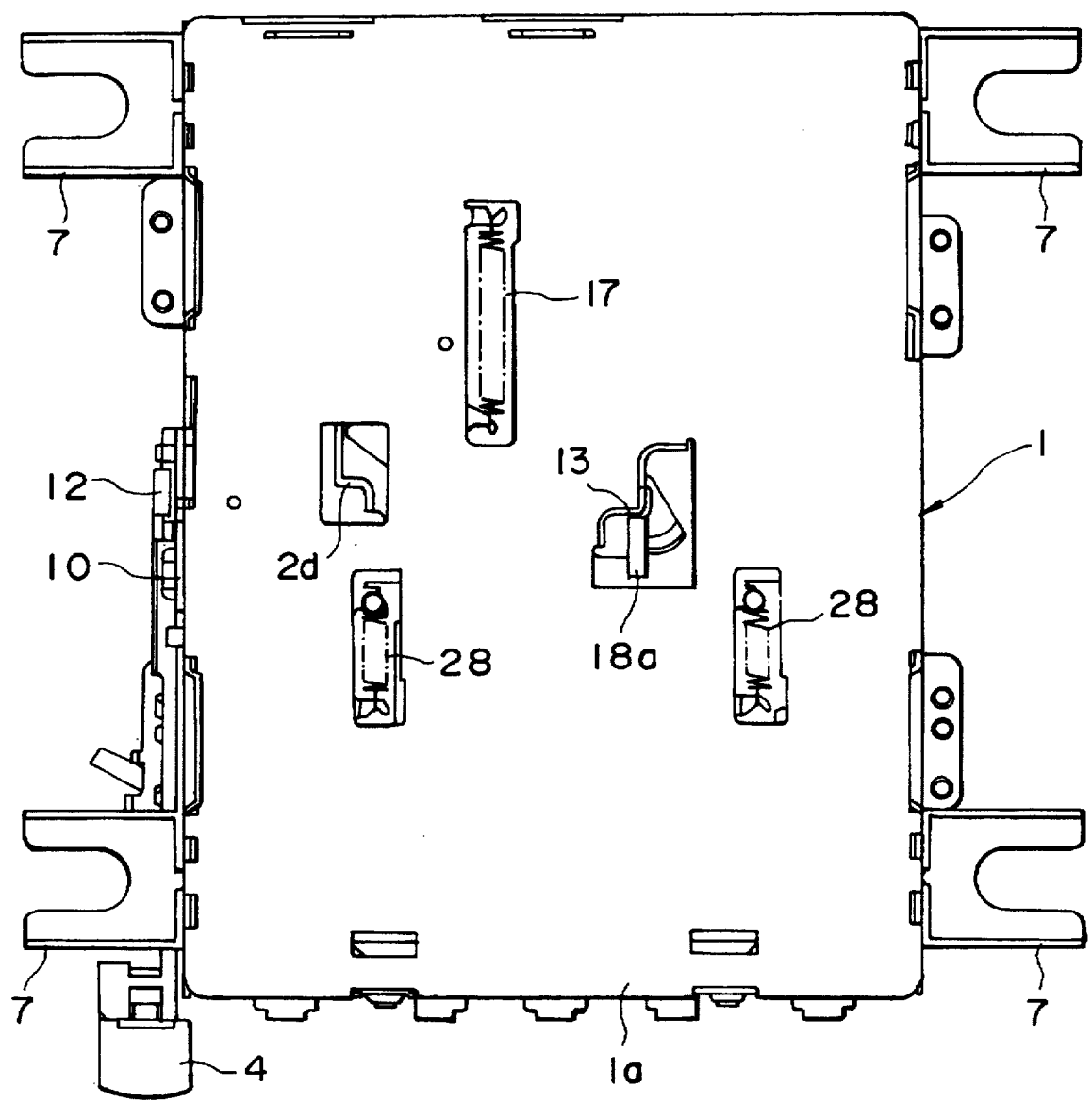
FIG. 3 is a bottom view of the magnetic recording/reproducing apparatus.

As shown in FIGS. 1 to 3, a magnetic recording/reproducing apparatus according to a first embodiment of the present invention is composed of a main chassis 1 formed by bending a flat metal plate, a sub chassis 2 supported on the main chassis 1 so as to move forward and backward, and up and down, a holder 3 fixed to the upper open end of the main chassis 1, and an eject lever 4 mounted on the right side of the main chassis 1. As described below, the sub chassis 2 moves to a loading position when a disc cartridge is inserted into the holder 3, and moves to an unloading position when the eject lever 4 is pressed.

Figure 4:
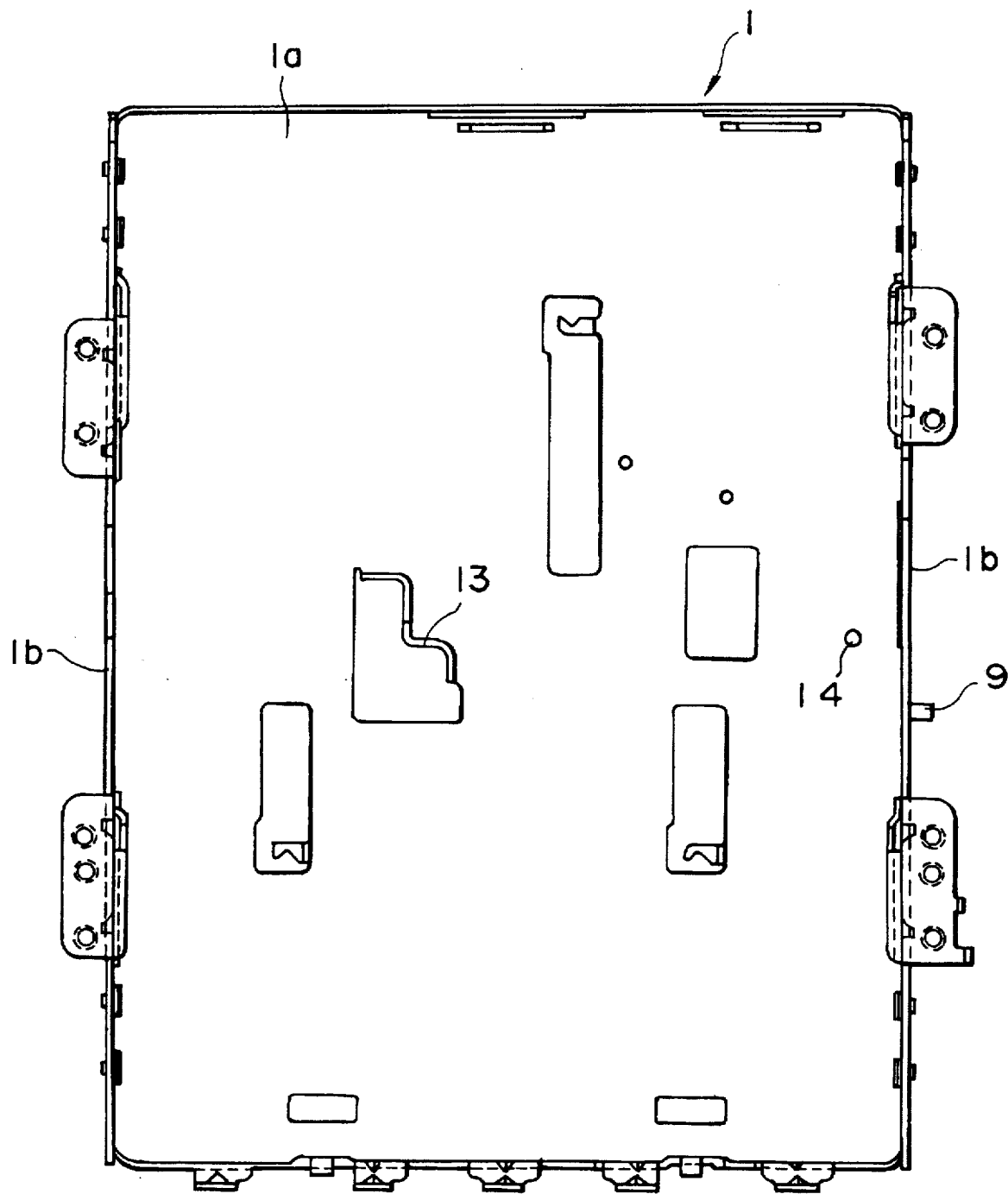
FIG. 4 is a plan view of a main chassis.
Figure 5:
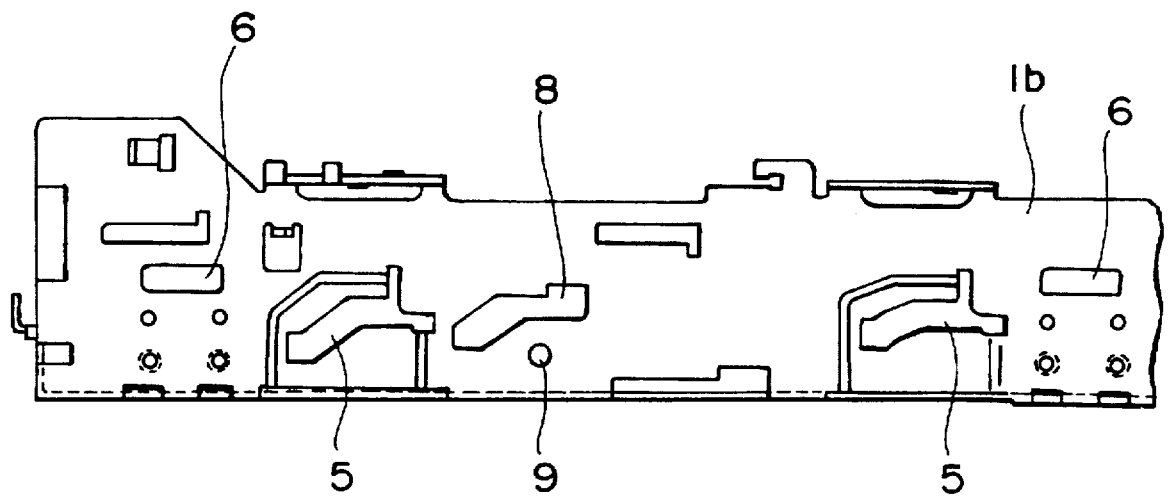
FIG. 5 is a right-hand side view of the main chassis.
Figure 6:
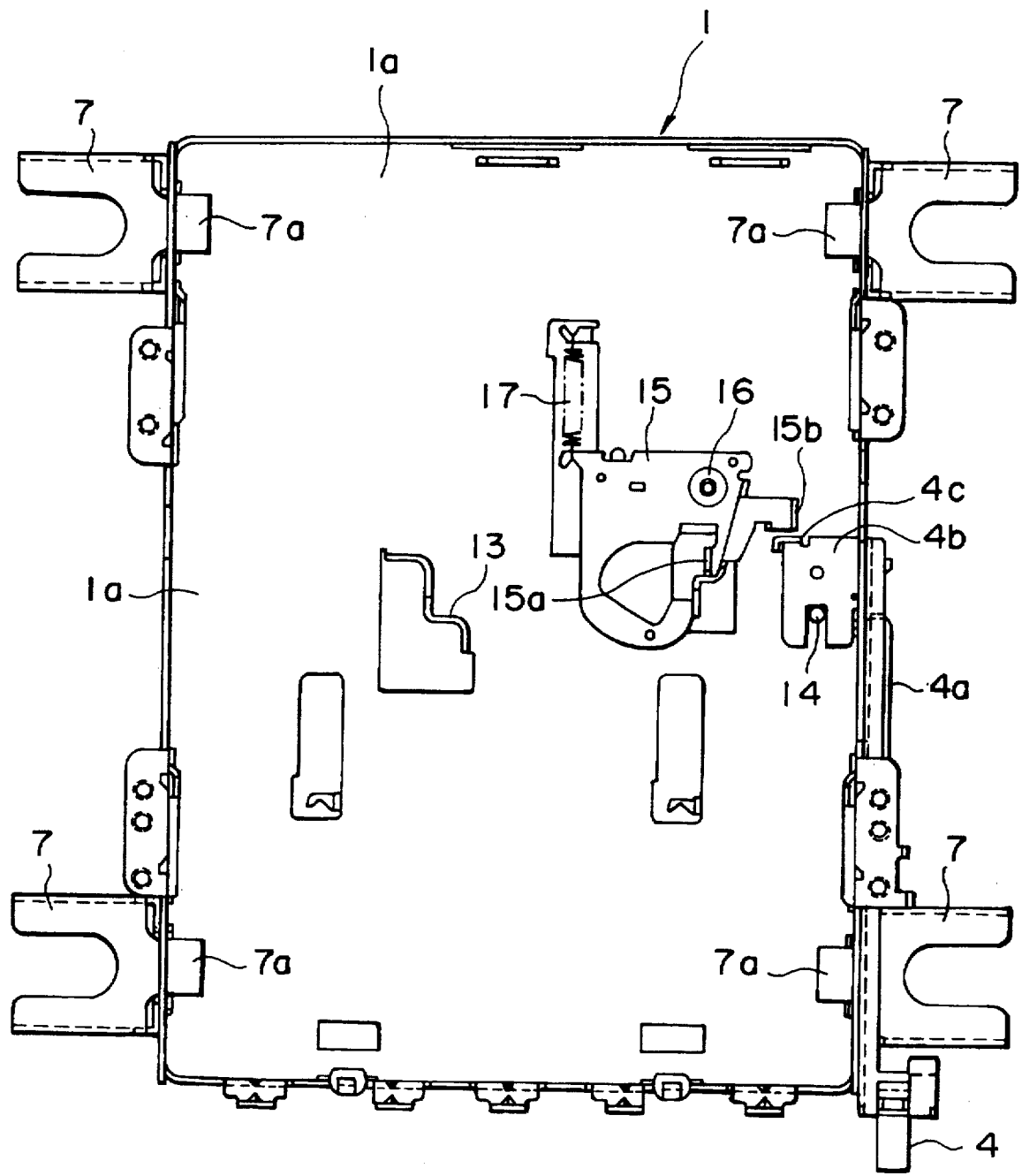
FIG. 6 is a plan view showing a state in which an eject lever and a first lock lever, etc. are incorporated into the main chassis.
Figure 7:
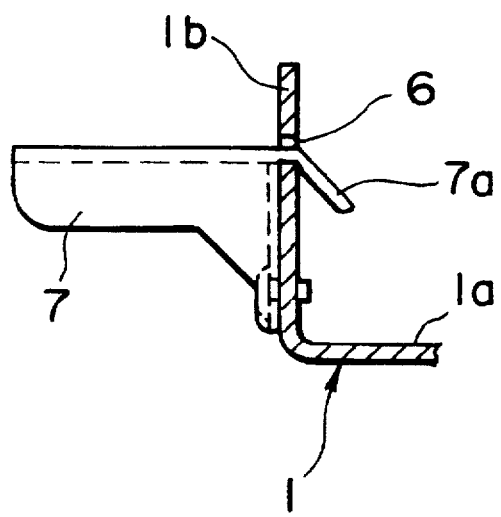
FIG. 7 is a sectional view showing a mounting state of a mounting plate.

As shown in FIGS. 4 to 6, a bottom surface 1a is bent at both its left and right sides to form a pair of perpendicular rising walls 1b. Two cam slots 5 and two apertures 6 are formed in each of the rising walls 1b. Metallic mounting plates 7 are secured by screws to four corners of the main chassis 1, and by attaching these mounting plates 7 to the main unit (not shown) through a shock absorbing rubber, etc., the entire magnetic recording/reproducing apparatus including the main chassis is elastically supported inside the main unit. A stopper piece 7a is formed on each of the mounting plates 7, and each stopper piece 7a extends through the apertures 6 to the inside of the rising wall 1b. It is apparent from FIG. 7 that the stopper piece 7a is bent to form an acute angle with respect to the rising wall 1b so that the mounting plate 7 is temporarily held by the rising wall 1b using the stopper piece 7a when securing the mounting plate 7 to the rising wall 1b by screws. In this embodiment, the stopper pieces 7a are formed on all the mounting plates 7 in order to achieve commonality of components. However, the stopper pieces 7a may be omitted from two mounting plates 7 of the proximal side (the lower side in FIGS. 1 and 6, and the left side of FIGS. 2 and 5) of the main chassis 1. In this case, the stopper pieces 7a formed on the mounting plates 7 of the distal side of the main chassis 1 serve as stopper members for determining a forward position of the sub chassis 2.

Figure 8:
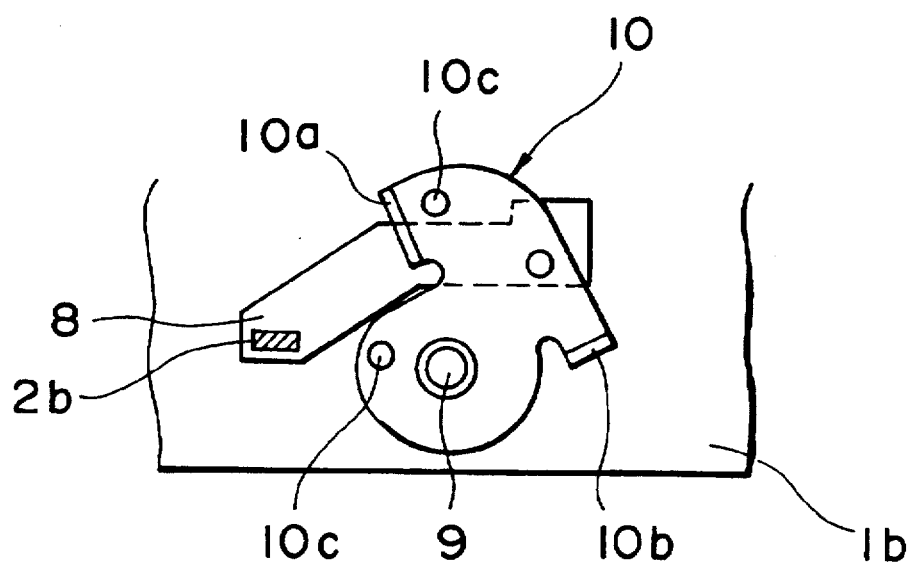
FIG. 8 is a side view showing a mounting state of an auxiliary lever.
Figure 9:
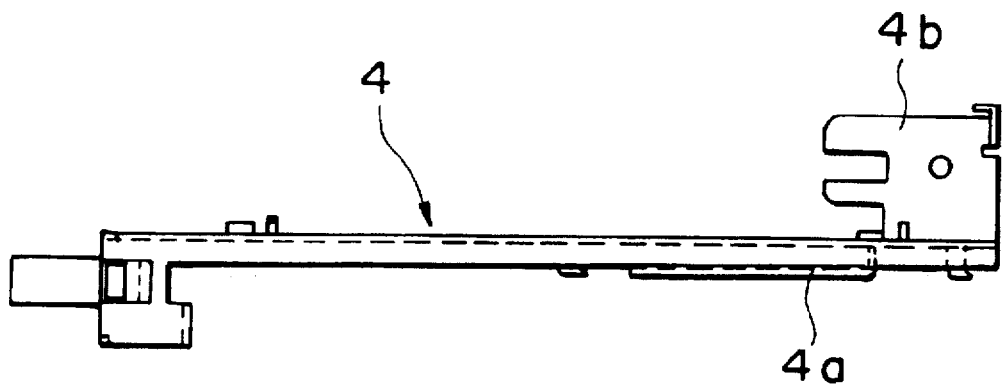
FIG. 9 is a plan view of the eject lever.
Figure 10:
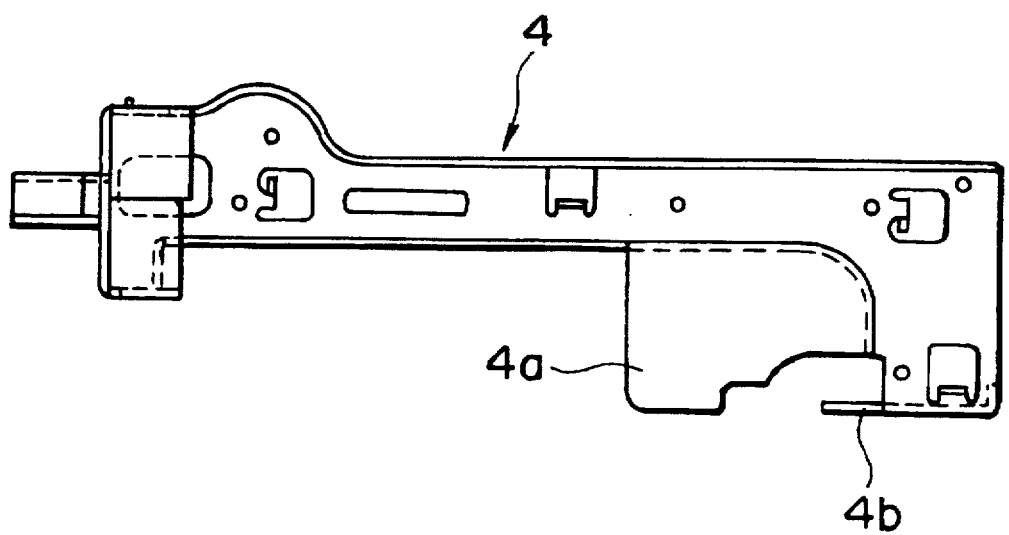
FIG. 10 is a side view of the eject lever.

An opening 8 is formed in the rising wall 1b of the right side of the main chassis 1, and as shown in FIG. 8, an auxiliary lever 10 is rotatably supported by a spindle 9 projecting below the opening 8. The auxiliary lever 10 is bent to form an abutment portion 10a and a retaining piece 10b, and a plurality of projections 10c are formed on the surface of the auxiliary lever 10. In addition, the eject lever 4 is slidably mounted to the right-side rising wall 1b for forward and backward movement. An outwardly swelling cover 4a and an inwardly bending sliding piece 4b are formed on the eject lever 4, as shown in FIGS. 9 and 10. As shown in FIG. 2, a spring 11 is provided between the eject lever 4 and the rising wall 1b, and the eject lever 4 is always urged by a resilient force of the spring 11 to the proximal side of the main chassis 1. In addition, a spring 12 is provided between the eject lever 4 and the retaining piece 10b of the auxiliary lever 10, and a major portion of the auxiliary lever 10 is covered with the cover 4a of eject lever 4.

Returning to FIGS. 4 and 6, a stopper projection 13 and a guide projection 14 are formed on the bottom surface 1a of the main chassis 1, and the sliding piece 4b of the eject lever 4 is guided by the guide projection 14 for the forward and backward movement. In addition, a first locking lever 15 is rotatably supported by a shaft 16 on the bottom surface 1a of the main chassis 1, and a locking portion 15a and a receiving portion 15b are formed on the first locking lever 15. The first locking lever 15 is urged by a spring 17 in the clockwise direction of FIG. 6, and the receiving portion 15b faces a removal portion 4c formed at the distal end of the sliding piece 4b of the eject lever 4.

Figure 11:
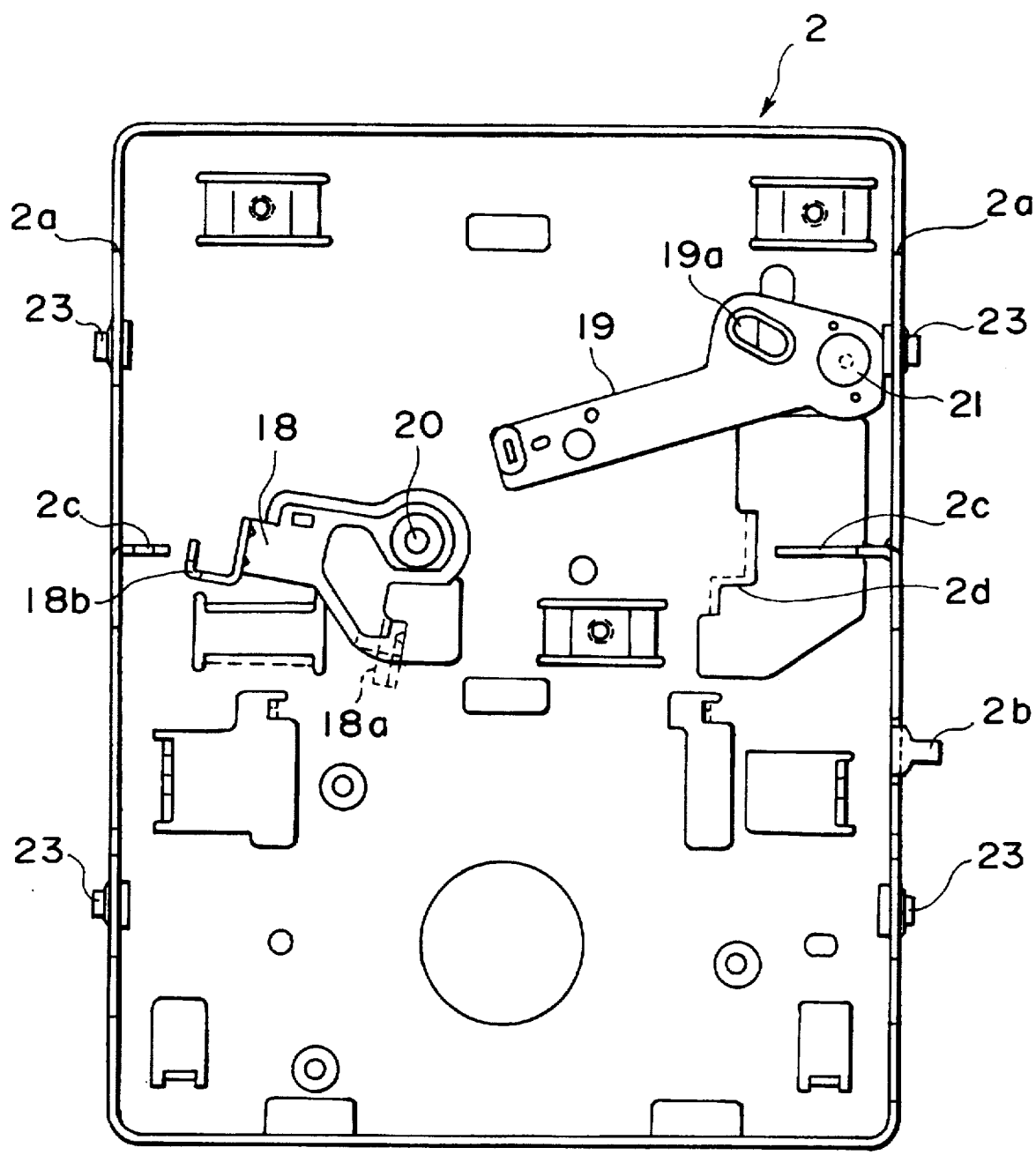
FIG. 11 is a plan view of a sub chassis.

As shown in FIG. 11, a second locking lever 18 and a drive arm 19 are rotatably supported around shafts 20 and 21, respectively, on the sub chassis 2 and an engaging hole 19a is formed in the drive arm 19. The second locking lever 18 is urged by a spring 22 in the counterclockwise direction of FIG. 11, and has a locking portion 18a which can be engaged with and disengaged from the stopper projection 13, and a receiving portion 18b which can be in abutment with the disc cartridge. In addition, two guide projections 23 are formed on each side of the sub chassis 2, and these guide projections 23 are inserted into respective cam slots 5 of the main chassis 1. Further, step portions 2a are formed on both distal ends of the sub chassis 2 (the top part in FIG. 11). These step portions 2a are brought into abutment with the stopper pieces 7a, whereby the forward position of the sub chassis 2 is determined. The sub chassis 2 is bent at its right side to form a projection 2b, which is inserted into the opening 8 of the main chassis 1 to face the abutment portion 10a of the auxiliary lever 10 (see FIG. 8).

Figure 12:
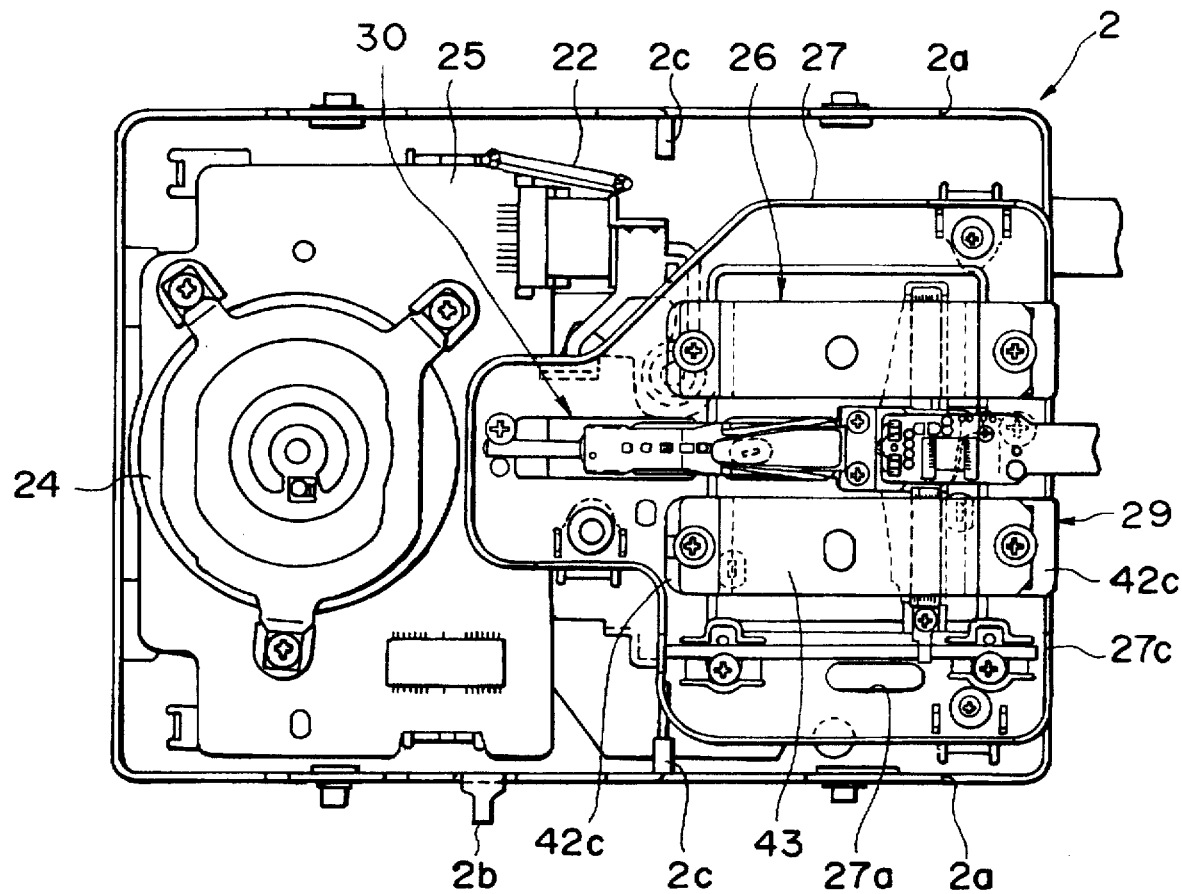
FIG. 12 is a plan view showing a state in which a head transport mechanism, etc. are mounted on the sub chassis.
Figure 13:
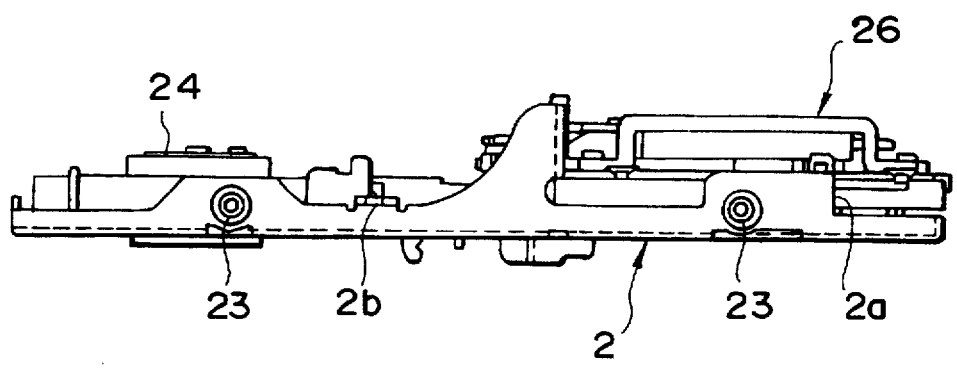
FIG. 13 is a side view of the sub chassis.
Figure 14:
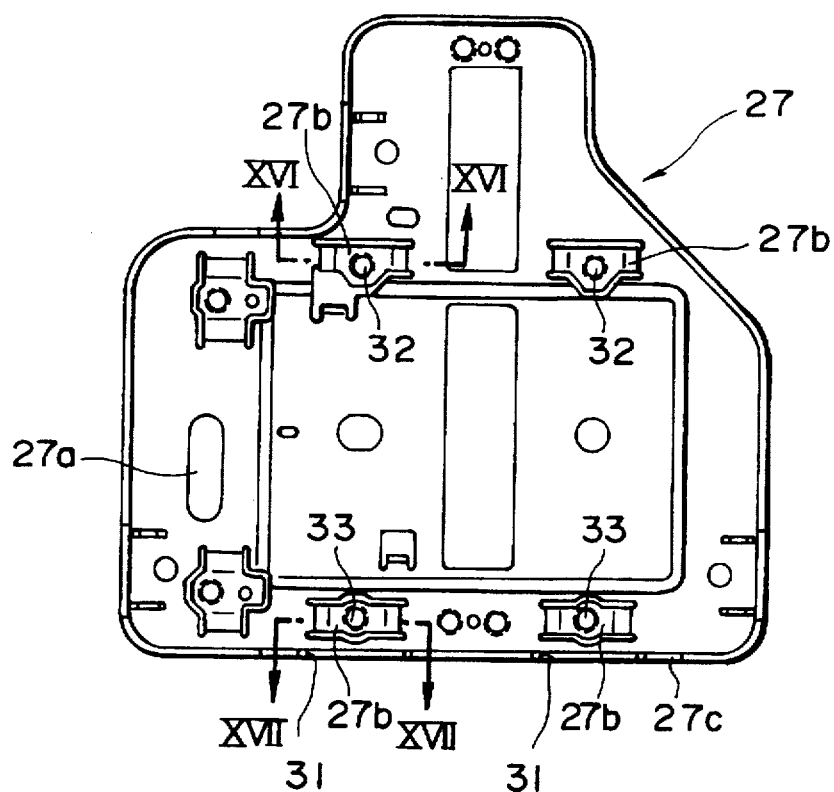
FIG. 14 is a plan view of a supporting plate.
Figure 15:
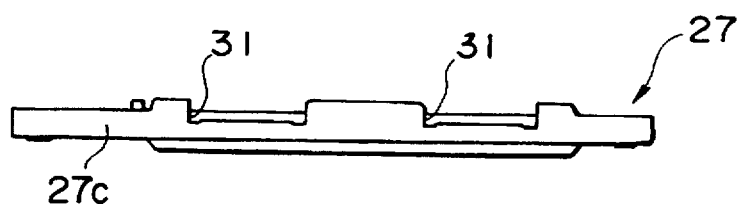
FIG. 15 is a rear elevation of the supporting plate.
Figure 16:
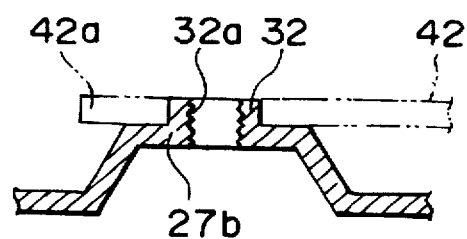
FIG. 16 is a sectional view taken along the line XVI—XVI of FIG. 14.
Figure 17:
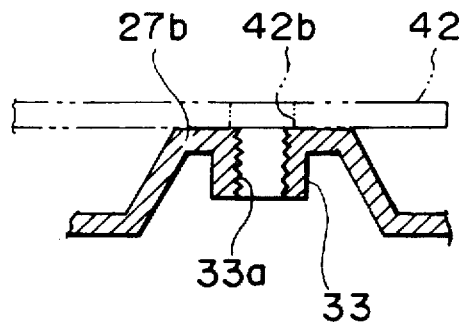
FIG. 17 is a sectional view taken along the line XVII—XVII of FIG. 14.

As shown in FIGS. 11 to 13, a circuit board 25 having a spindle motor 24 and its driving circuit components, and a support plate 27 having a head transport mechanism 26 are fixed on the sub chassis 2, and the drive arm 19 is located between the sub chassis 2 and the support plate 27. Both sides of the sub chassis 2 are bent inward to form a pair of receiving portions 2c which can abut with the distal end of the disc cartridge (the end inserted into the recording and/or reproducing apparatus), and a stopper 2d which can be engaged with and disengaged from the locking portion 15a of the first locking lever 15 is formed on the inner bottom surface of the sub chassis 2. A pair of springs 28 are provided between the sub chassis 2 and the bottom surface 1a of the main chassis 1 (see FIG. 3). The sub chassis 2 is always urged by a tensile force of the springs 28 to the proximal side of the main chassis 1, i.e., the unloading position.

The head transport mechanism 26 is composed of a linear motor 29, a carriage 30 driven by the linear motor 29, and the support plate 27 for supporting the linear motor 29 and the carriage 30. As shown in FIGS. 14 to 17, the peripheral edge of the supporting plate 27 is bent upward, and a pair of guide grooves 31 are formed in the bent rear end portion 27c. A slot 27a is formed in the inner bottom surface of the supporting plate 27, and four supporting portions 27b are projected in the shape of a trapezoid from the inner bottom surface. All the surfaces of the support portions 27b are flush with each other. Cylindrical projections 32 projecting upward are formed on the two support portions 27b located away from the guide grooves 31, and threads 32a are cut on the inner surfaces of the cylindrical projections 32. On the other hand, cylindrical projections 33 projecting downward are formed on the two support portions 27b located near the guide grooves 31, and threads 33a are also cut in the inner surfaces of the cylindrical projections 33. The cylindrical projections 32 and 33 may be preferably formed integrally with the support plate 27 with the use of burring. However, the cylindrical projections 33 may be omitted. In this case, tapped holes may be formed directly in the surface of the support portions 27b.

Figure 18:
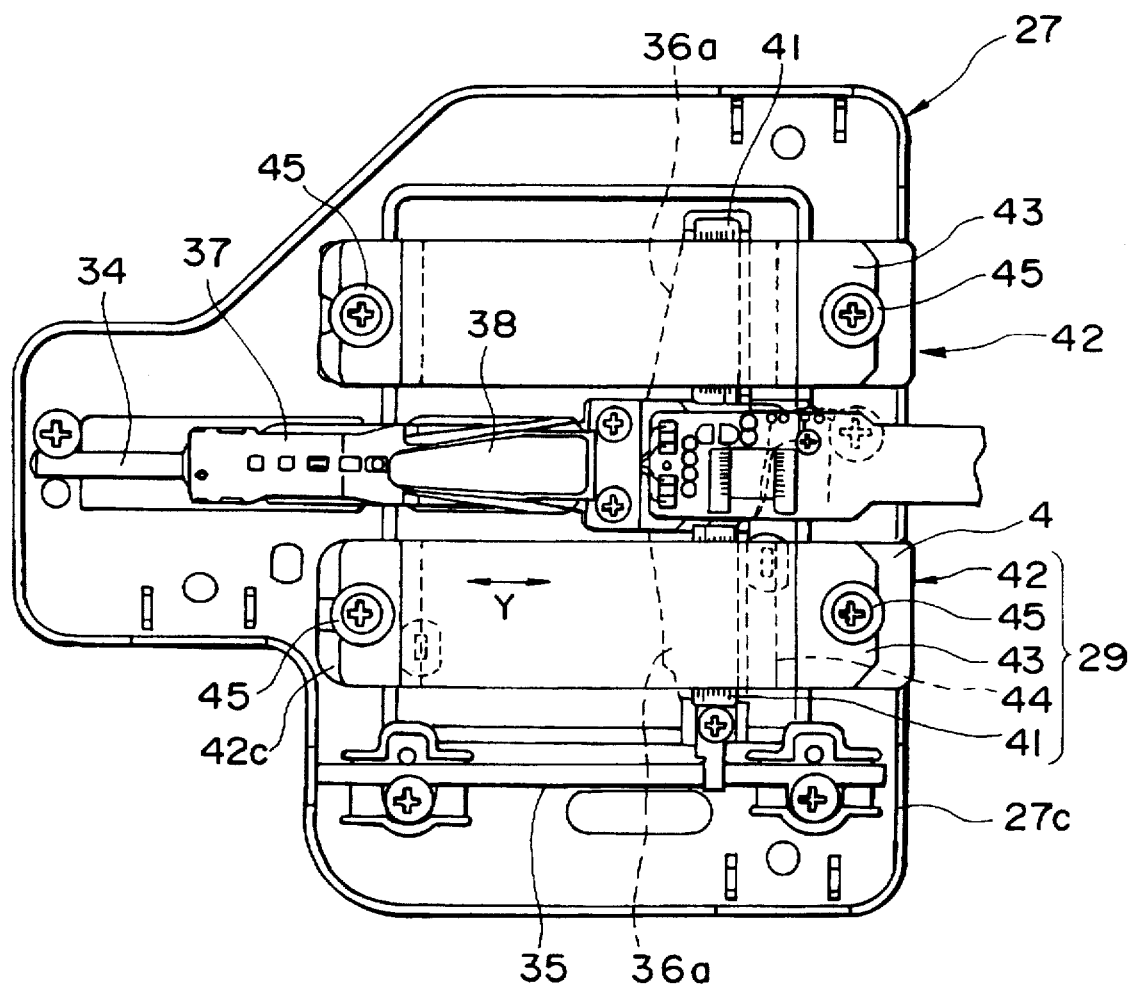
FIG. 18 is a plan view of a head transfer mechanism.
Figure 19:
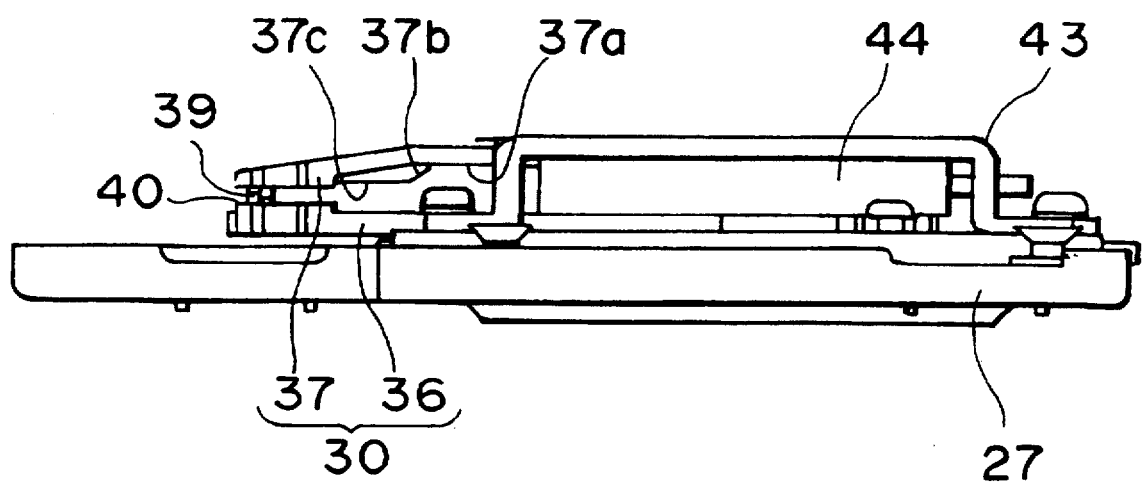
FIG. 19 is a side view of the head transfer mechanism.

As shown in FIGS. 18 and 19, guide shafts 34 and 35 are fixed on the center of and the right side (the lower side of FIG. 18) of the support plate 27, respectively, and the carriage 30 is guided by the guide shafts 34 and 35 in the radial direction of a magnetic disc. The carriage 30 is composed of a base 36 having a pair of arms 36a, and an arm 37 which is hinge-coupled to the top surface of the base 36 through a spring. The arm 37 is urged by a load spring 38 toward the base 36. The guide shaft 34 is inserted into the base 36, and one of the arms 36a is in engagement with the guide shaft 35. A first flat portion 37a, an inclined portion 37b, and a second flat portion 37c are successively formed on the bottom surface of the arm 37, and an upper magnetic head 39 is attached on the proximal end thereof. On the other hand, a lower magnetic head 40 is attached on the carriage 30 to face the upper magnetic head 39. A projection (not shown) which can abut with the tip of the drive arm 19 is formed on the bottom surface of the base 36, and the engaging hole 19a of the drive arm 19 is exposed to the slot 27a of the support plate 27.

Figure 20:
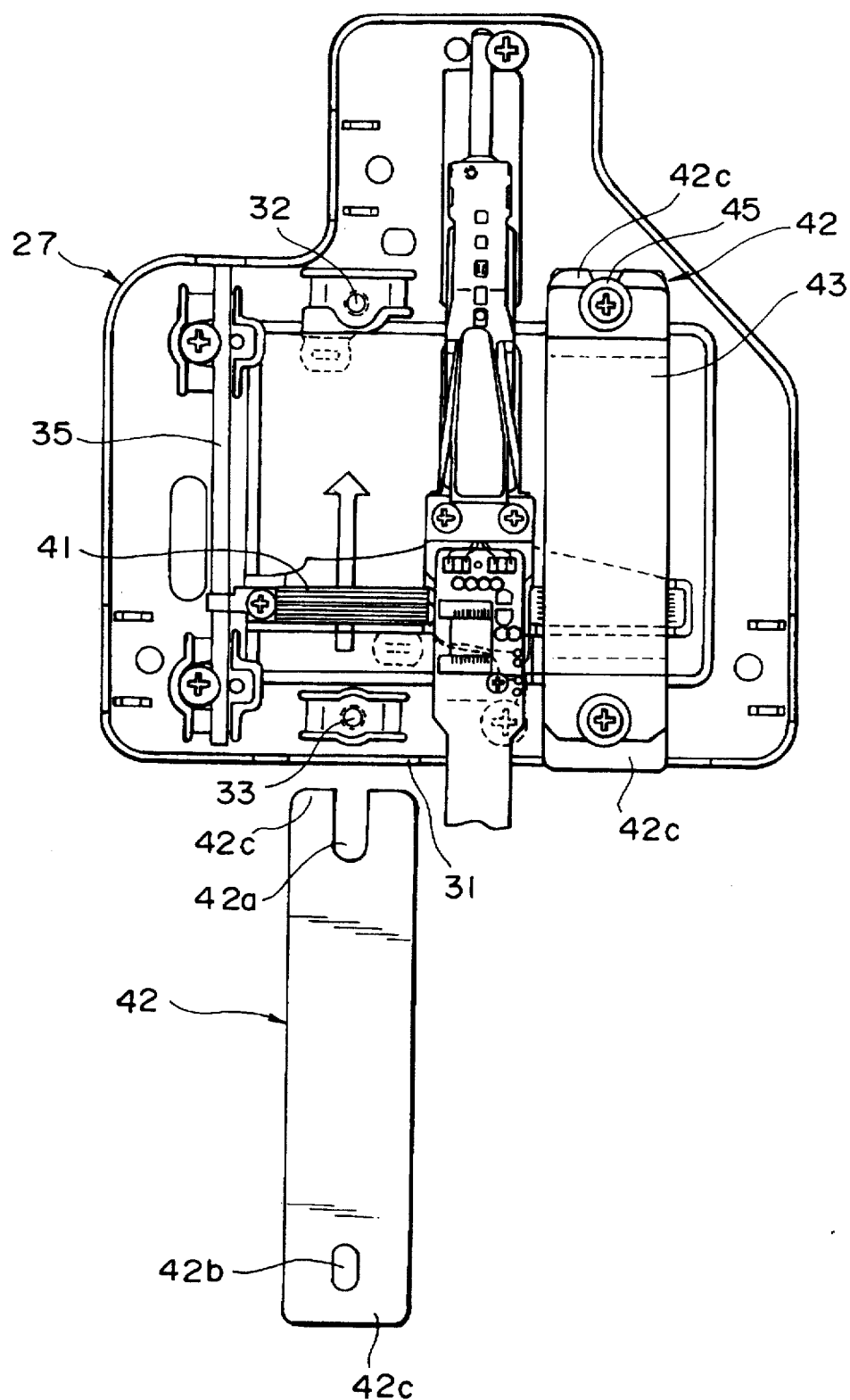
FIG. 20 is a plan view showing an assembly step of the head transport mechanism.

The linear motor 29 is composed of an exciting coil 41, and an I-shaped bottom yoke 42, a U-shaped top yoke 43, and a magnet 44 forming a magnetic circuit. A set of these components are disposed on both left and right sides through the base 36. The exciting coils 41 are fixed to the arms 36a of the base 36, and the I-shaped bottom yokes 42 are inserted into the exciting coils 41. The magnets 44 are adhered to the bottom surfaces of the top yokes 43, and the magnets 44 and top yokes 43 are placed on the bottom yokes 42 with the exciting coils 41 being in between. Both ends of the top yokes 43 and the bottom yokes 42 are secured to the support plate 27 by set screws 45, and the set screws 45 are screwed into the threads 32a and 33a. When the top yokes 43 and bottom yokes 42 are overlapped, and they are secured by the set screws 45, protrusions 42c provided on both ends of the bottom yokes 42 protrude outward from the overlapping portions of the bottom yokes 42 and the top yokes 43 near the set screws in the direction of the length of the bottom yokes 42 (the Y direction shown in FIG. 18), as shown in FIGS. 12, 18, and 20.

Figure 21:
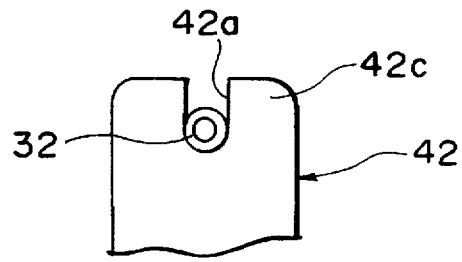
FIG. 21 is an illustration showing a state in which a bottom yoke is engaged with a cylindrical projection.
Figure 32:
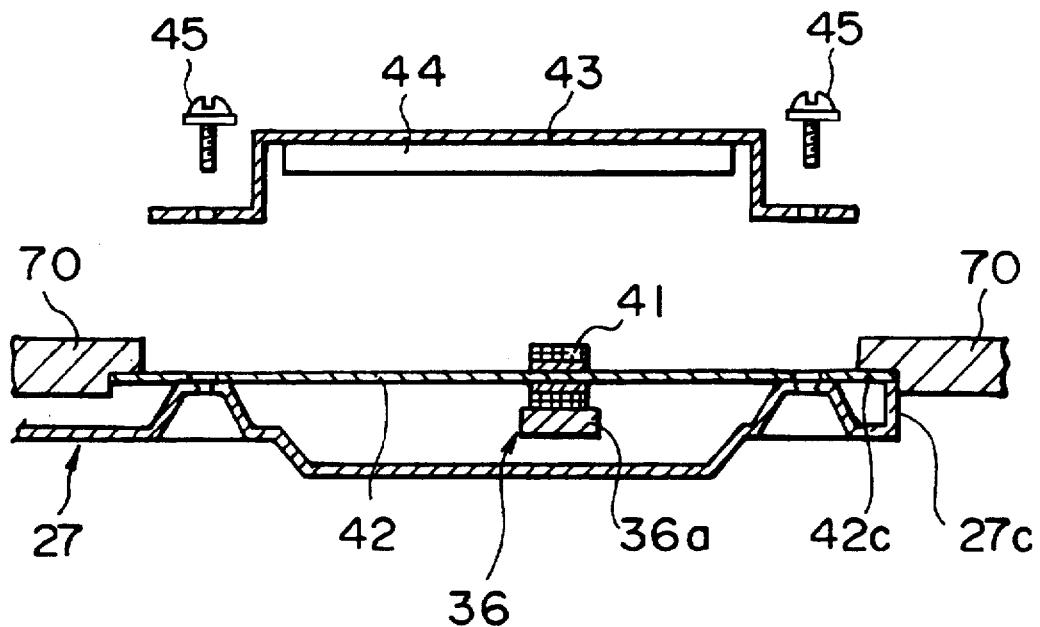
FIG. 32 is a sectional view showing an essential portion of an assembly step of a bottom yoke and a top yoke before assembly.
Figure 33:
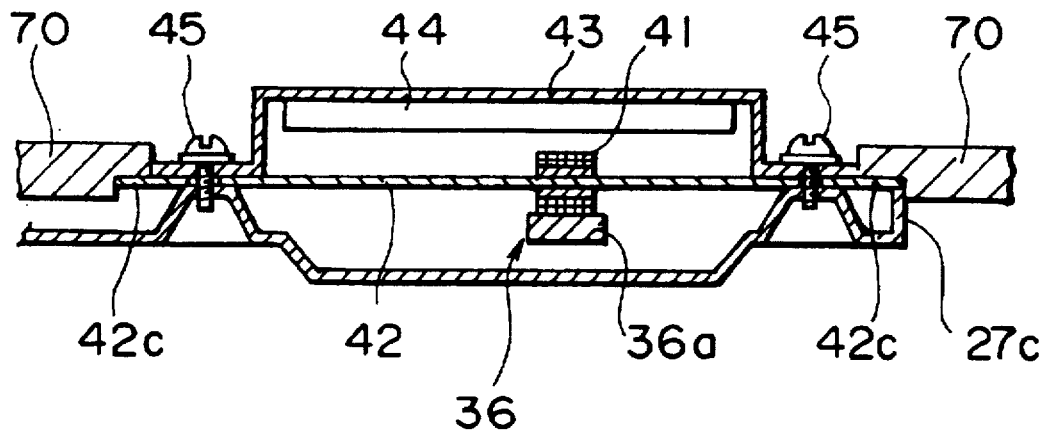
FIG. 33 is a sectional view showing an essential portion of an assembly step of the bottom yoke and the top yoke after assembly.

When assembling the thus constructed head transport mechanism 26, the carriage 30 to which the exciting coils 41 are fixed, and the guide shafts 34 and 35 are first installed on the support plate 27, and the support plate 27 is secured on the sub chassis 2 by screws and thereafter, the bottom yokes 42 and the top yokes 43 are overlapped and secured to the support plate 27 by screws. As shown in FIG. 20, a cutout 42a and a hole 42b are formed in both ends of the respective bottom yokes 42, and the bottom yokes 42 are inserted in the direction shown by the arrow from the cutout 42a side. At this time, the bottom yoke 42 is inserted with its transverse movement controlled by the guide groove 31 of the support plate 27, and the cutout 42a is in abutment with the outer peripheral surface of each cylindrical projection 32 after being inserted into each exciting coil 41, as shown in FIG. 21, so that the distal end of each bottom yoke 42 is located by each cutout 42a and each cylindrical projection 32, and the proximal end of each bottom yoke 42 is located by each guide groove 31. Therefore, when the top yokes 43 are overlapped on the bottom yokes 42 in this state, the set screws 45 can easily be screwed into the threads 32a and 33a. After the bottom yokes 42 have been located by the cylindrical projections 32, the protrusions 42c of the respective bottom yokes 42 are pressed by jigs 70 to control upward and sideward movements of the bottom yokes 42, thereby locating the bottom yokes 42, as shown in FIGS. 32 and 33. Thereafter, the top yokes 43 is overlapped on the bottom yokes 42 in the state as shown in FIG. 33. At this time, since the protrusions 42c are pressed by the jigs 70, the bottom yokes 42 do not move upward even if a magnetic action is exerted thereon. Therefore, the bottom yokes 42 do not come into contact with the exciting coils 41, so that the exciting coils 41 are not damaged.

That is, the protrusions 42c can serve as pressing members of the bottom yokes 42.

Figure 22A:
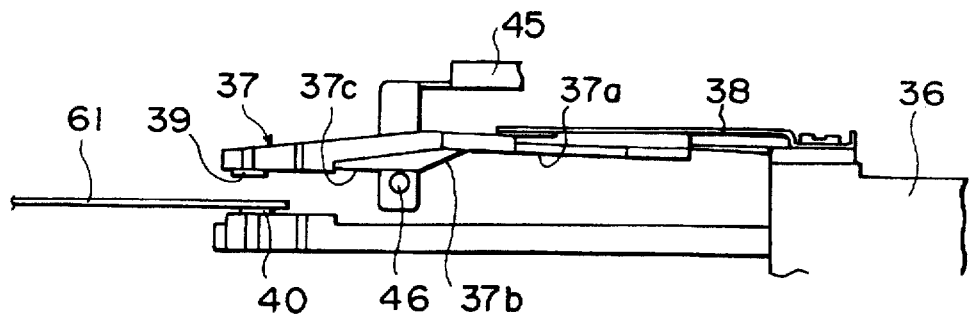
FIGS. 22A to 22C are illustrations each showing an operation of the head transport mechanism.
Figure 22B:
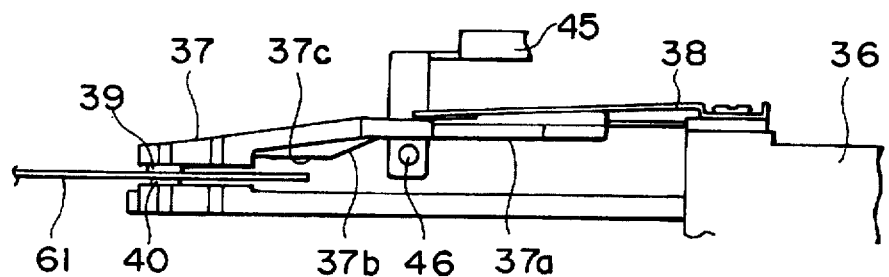
Figure 22C:
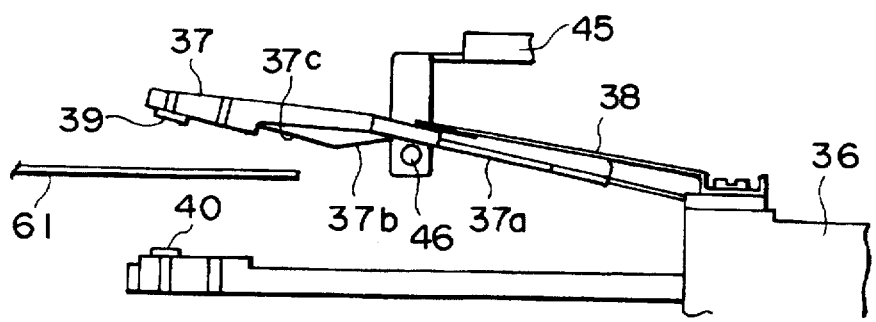

Returning to FIG. 1, the holder 3 and a bridge plate 71 are fixed on the upper open end of the main chassis 1, and a drive pin 46 and a control pin 47 are fixed to the bridge plate 71. The control pin 47 extends directly downward to be inserted into the engaging hole 19a of the drive arm 19 so as to rotate the drive arm 19 associated with the movement of the sub chassis 2. The drive pin 46 extends horizontally across the lower portion of the arm 37 of the carriage 30. In a state where the sub chassis 2 is in the upper loading position, the upper magnetic head 39 separates from the lower magnetic head 40 when the drive pin 46 is in abutment with the second flat portion 37c of the arm 37, as shown in FIG. 22A. When the drive pin 46 is located on the first flat portion 37a, the upper magnetic head 39 is urged by the load spring 38 toward the lower magnetic head 40, as shown in FIG. 22B. In addition, when the sub chassis 2 is in the lower loading position, the drive pin 46 comes into abutment with the first flat portion 37a, and the upper magnetic head 39 and the lower magnetic head 40 are separated by the maximum amount, as shown in FIG. 22C.

Figure 23:
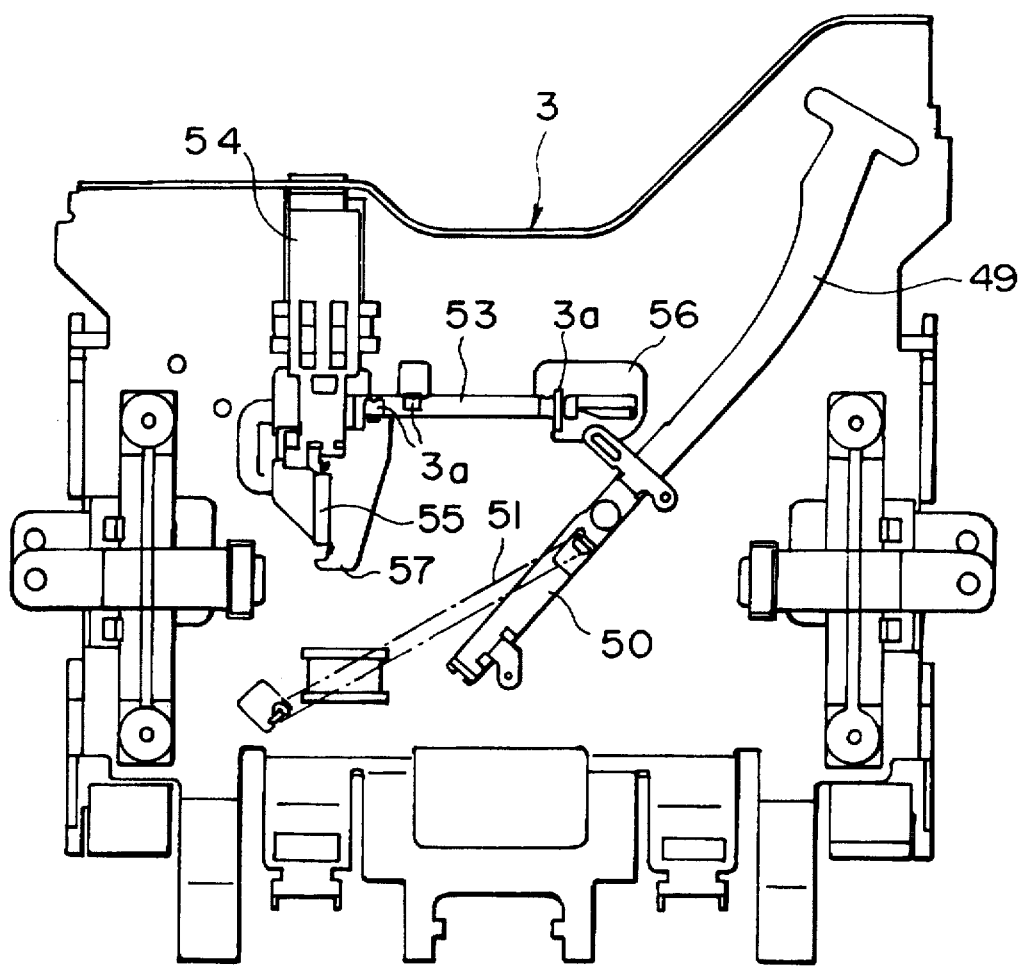
FIG. 23 is a plan view of a holder.
Figure 24:
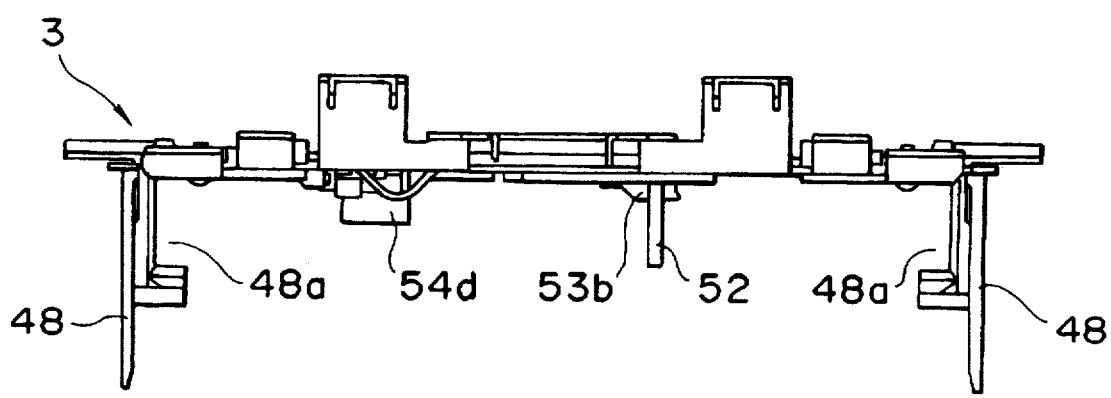
FIG. 24 is a front view of the holder.

As shown in FIGS. 23 and 24, guide members 48 made of synthetic resin are attached to both sides of the holder 3, and grooves 48a for guiding the insertion of the disc cartridge are formed in the inner surface of the guide members 48 so as to constitute an insertion path for the disc cartridge. A guide slot 49 is formed in the top surface of the holder 3, and a shutter actuating member 50 is slidably engaged with the guide slot 49. The shutter actuating member 50 is urged by a spring 51 in one direction to be located at the beginning of the guide slot 49 (the lower side of FIG. 23), and is provided with an actuating pin 52 extending under the holder 3. In addition, first and second rotating members 53 and 54 constituting stopper members are supported on the top surface of the holder 3, and the second rotating member 54 is urged by a spring 55 under the holder 3 (in the direction of the bottom surface 1a of the main chassis 1).

Figure 25:
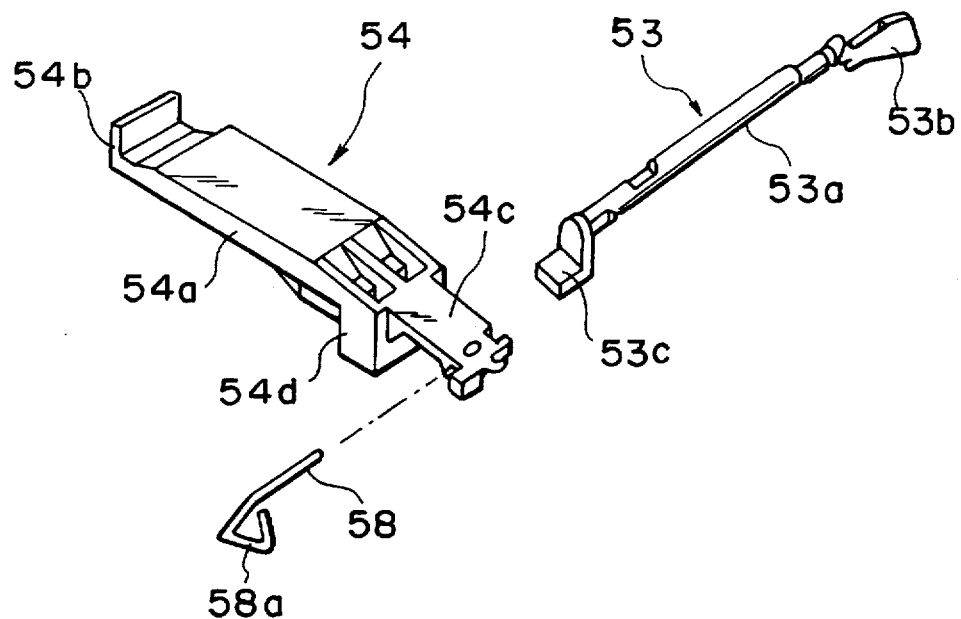
FIG. 25 is an exploded perspective view of a stopper means.

As shown in FIG. 25, the first rotating member 53 has a shaft-like section 53a which is substantially perpendicular to the insertion direction of the disc cartridge, and a detecting section 53b and a cam 53c are integrally formed on both ends. The shaft-like section 53a is rotatably supported by a plurality of cut-and-raised portions 3a formed on the top surface of the holder 3, and the detecting section 53b and the cam 53c extend downward through apertures 56 and 57. On the other hand, the second rotating member 54 has a plate-like section 54a which is substantially perpendicular to the shaft-like section 53a of the first rotating member 53, and a bent portion 54b and a receiving portion 54c are integrally formed on both sides thereof, respectively, and at the same time, an abutment portion 54d trails from the plate-like section 54a through the aperture 57. The bent portion 54b is rotatably supported by a cutout (not shown) formed in the upper rear end of the holder 3, and the receiving portion 54c is overlapped on the cam 53c within the aperture 57. In addition, a regulating member 58 is rotatably supported at the tip of the receiving portion 54c. The regulating member 58 is formed of a wire rod, and is bent at one end to form a triangular rotary portion 58a.

Figure 26:
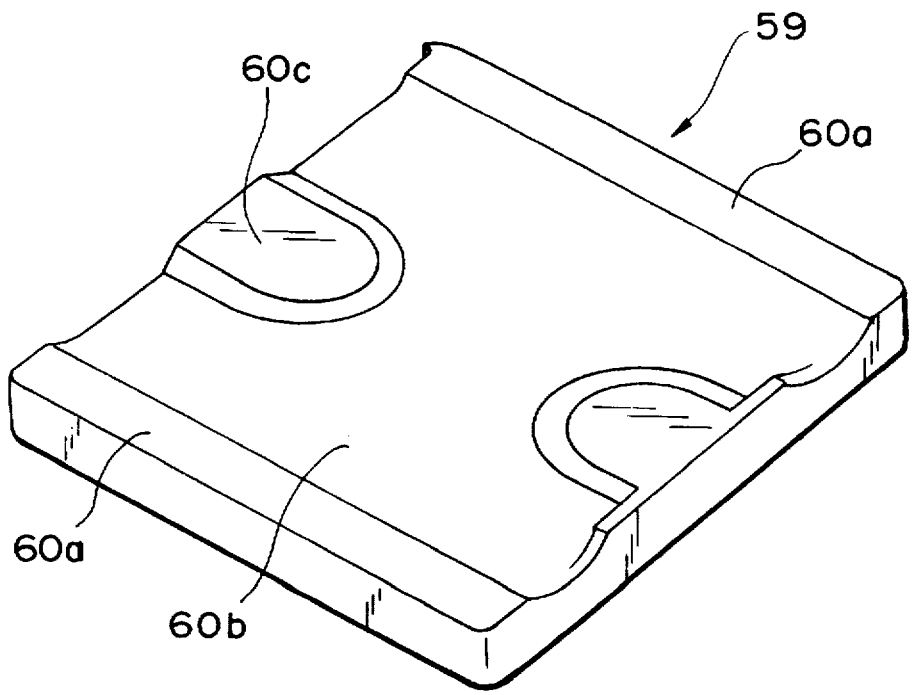
FIG. 26 is a perspective view of a disc cartridge.
Figure 27:
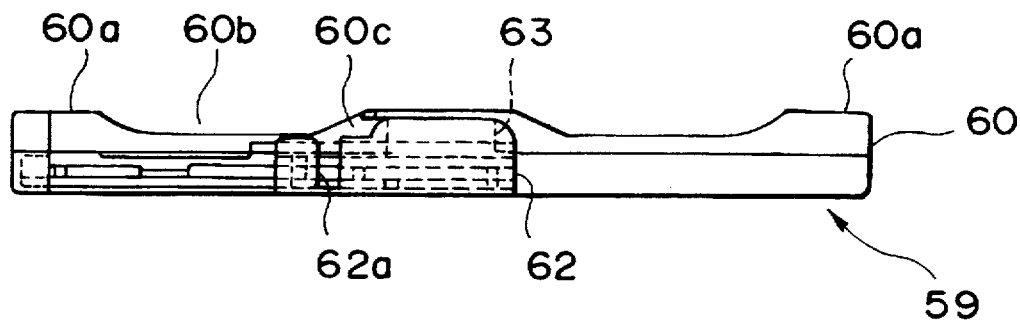
FIG. 27 is a front view of the disc cartridge.
Figure 28:
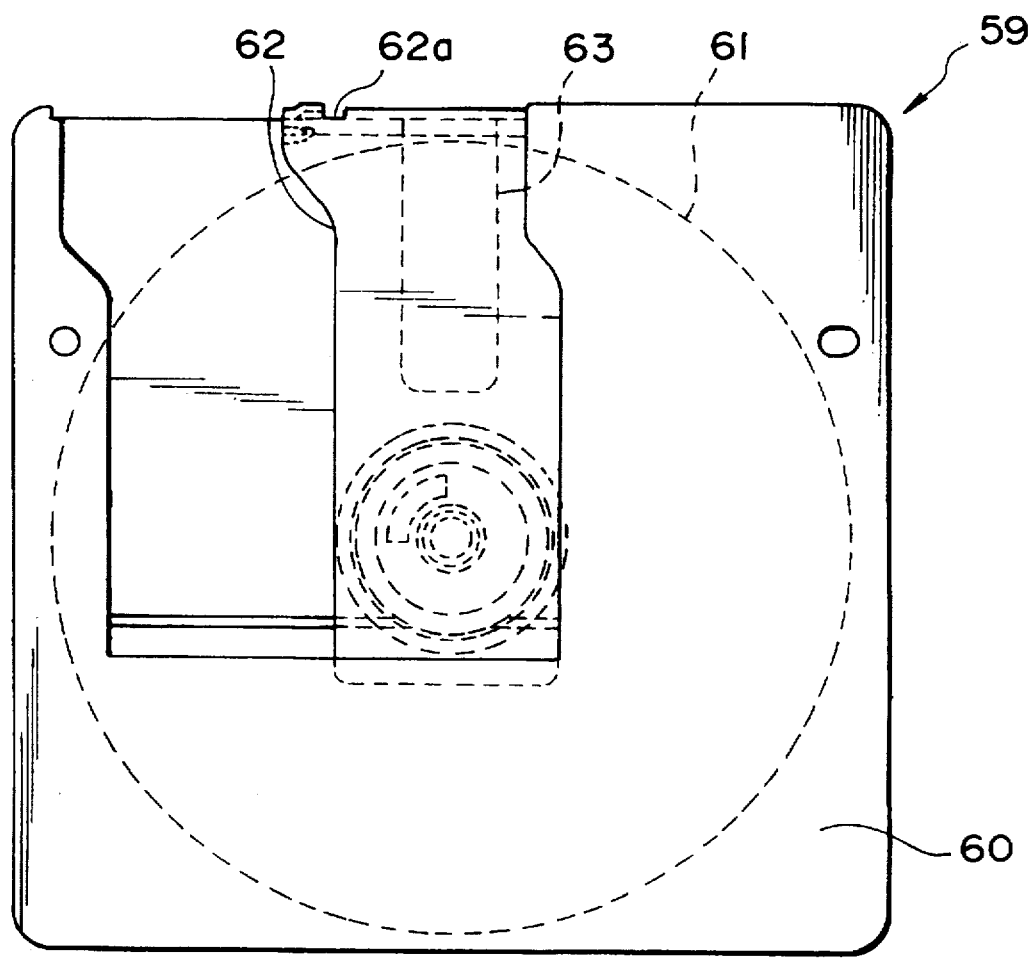
FIG. 28 is a bottom view of the disc cartridge.

As shown in FIGS. 26 to 28, a disc cartridge 59 is composed of a cartridge case 60 which is made by joining and integrating a pair of upper and lower cases formed of hard synthetic resin, a magnetic disc 61 rotatably accommodated in the cartridge case 60, and a shutter 62 reciprocally disposed in the cartridge case 60. The shutter 62 is urged by a spring (not shown) in a direction to close an opening, which will be described later. The shutter 62 is bent into an L-shape along the front surface to the bottom surface of the cartridge case 60, and a cutout 62a is formed in its front surface. The bottom surface of the cartridge case is flat, but projected portions 60a are formed on both sides of the top surface of the cartridge case 60, and recess 60b is formed between the projected portions 60a. Within the recess 60b, a swelling portion 60c is formed in front of the cartridge case 60, and an opening 63 is formed from the bottom surface to the front end surface of the cartridge case 60 located directly under the swelling portion 60c.

Figure 29A:
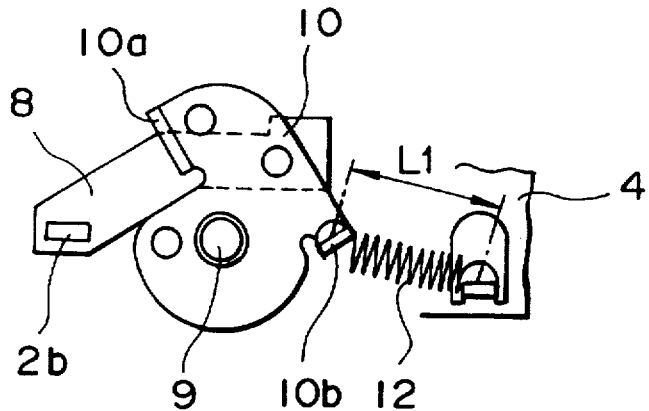
FIGS. 29A to 29C are illustrations each showing an operation of the auxiliary lever.

An operation of the thus constructed magnetic recording/reproducing apparatus will now be described. For easy understanding, the operation will be described in a state where the regulating member 58 is removed. When the disc cartridge 59 is not loaded, the sub chassis 2 is urged by the pair of springs 28 to the proximal side of the main chassis 1. As shown in FIG. 2, the guide projections 23 are located on the lower end of the cam slots 5, and the sub chassis 2 is located in the unloading position. In addition, the locking portion 18a of the second locking lever 18 is in abutment with the stopper projection 13 of the main chassis 1, whereby the movement of the sub chassis 2 is locked. At this time, as shown in FIG. 29A, the projection 2b of the sub chassis 2 is separated from the abutment portion 10a of the auxiliary lever 10, and the force of the spring 12 does not act on the sub chassis 2. In addition, the base 36 of the carriage 30 is in abutment with the drive arm 19 to be urged behind the support plate 27 so that the carriage is not moved by an external vibration. Further, as shown in FIG. 22C, the drive pin 46 comes into abutment with the first flat portion 37a of the arm 37, and the upper and lower magnetic heads 39 40 are separated by the maximum amount. At this time, the detecting section 53b and the abutment portion 54d are in the insertion path of the disc cartridge 59, and are located closer to the proximal side of the main chassis 1 than the upper magnetic head 39.

Figure 30A:
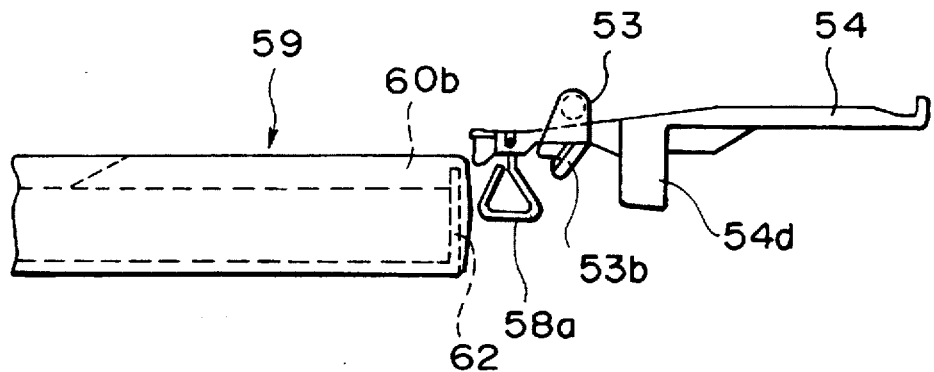
FIGS. 30A to 30C are illustrations each showing an operation of the stopper means, as seen from the side of the stopper means.
Figure 31A:
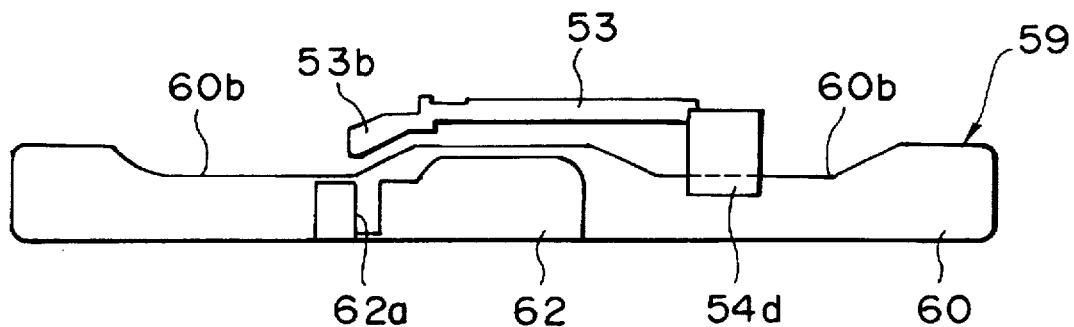
FIGS. 31A to 31C are illustrations each showing an operation of the stopper means, as seen from the rear of the stopper means.

When the disc cartridge 59 is inserted into the apparatus from an insertion opening (not shown) of a front surface of the apparatus, and then inserted into the holder 3 in the direction of the arrow A of FIG. 1 along the grooves 48a of the guide member 48, the shutter 62 of the disc cartridge 59 closes the opening 63. As shown in FIGS. 30A and 31A, the detecting section 53b of the first rotating member 53 faces the recess 60b of the cartridge case 60, and the abutment portion 54d faces the front surface of the cartridge case 60.

Figure 30B:
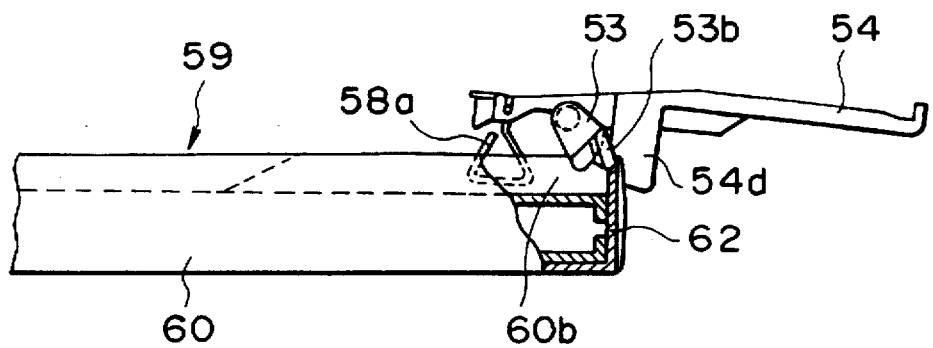
Figure 30C:
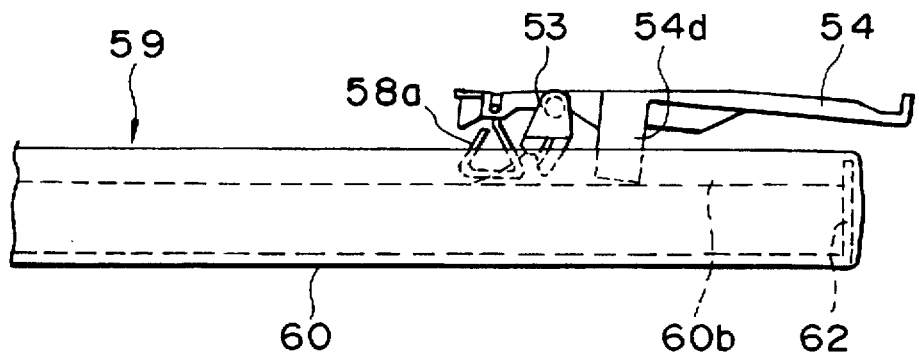
Figure 31B:
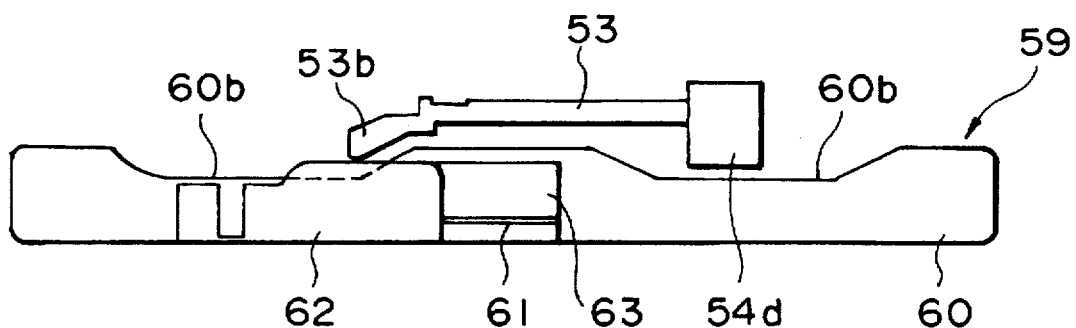
Figure 31C:
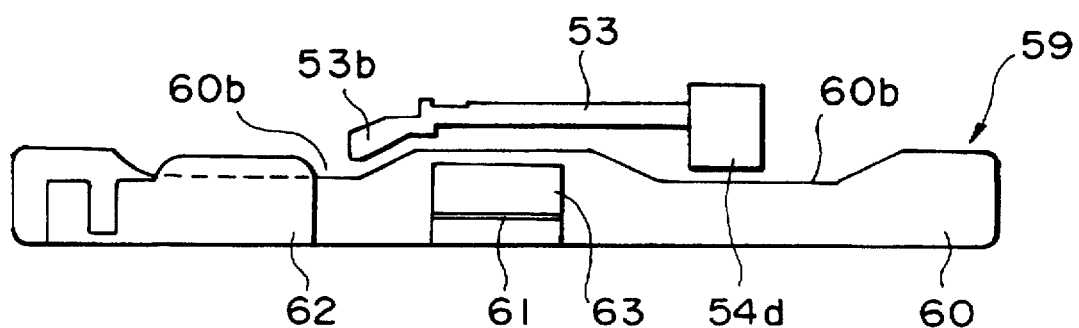

When the disc cartridge 59 is further inserted into the holder 3, the cutout 62a of the shutter 62 is engaged with the actuating pin 52, so that the shutter actuating member 50 moves within the guide slot 49 toward the end of the slot 49 and at the same time, the shutter 62 moves toward the recess 60b, whereby the opening 63 starts to open. As a result, as shown in FIGS. 30B and 31B, the detecting section 53b comes into abutment with the upper end of the moved shutter 62 to rotate the first rotating member 53, and the rotation is transmitted to the receiving portion 54c through the cam 53c, whereby the cam 53c pushes a receiving portion 54c above the holder 3. Thus, the second rotating member 54 rotates upward against the spring 55 using the bent portion 54b as a fulcrum, and the abutment portion 54d retreats from the insertion path of the disc cartridge 59 to move toward the recess 60b. As shown in FIGS. 30C and 31C, the detecting section 53b and the abutment portion 54d are located within the recess 60 after the shutter 62 has completely opened the opening 63, so that the disc cartridge 59 can be inserted into the innermost part of the holder 3 without being interrupted by the abutment portion 54d. The front surface of the disc cartridge 59 presses the receiving portion 18b during the insertion, whereby the second locking lever 18 rotates clockwise around the shaft 20, so that the sub chassis is unlocked. Thus, the upper magnetic head 39 and the arm 37 can enter the cartridge case 60 from the opening 63.

Figure 29B:
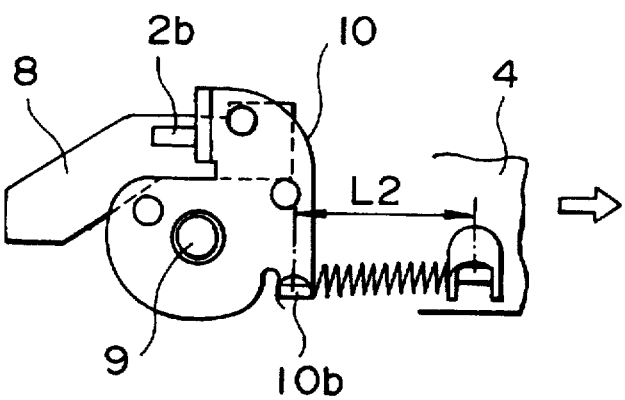
Figure 29C:
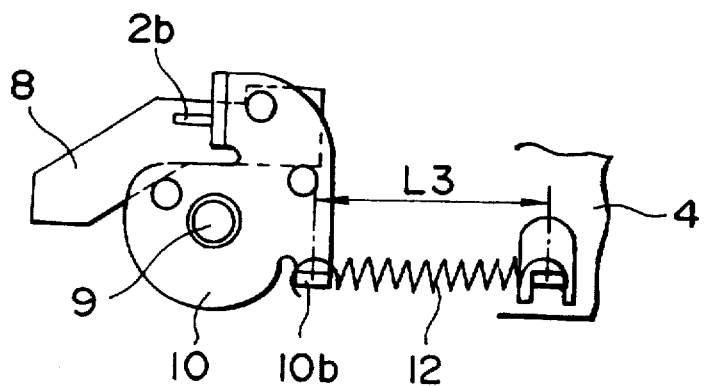

When the disc cartridge 59 is inserted into the innermost part of the holder 3, the front surface of the cartridge case 60 strikes against the receiving portions 2c of the sub chassis 2, and the receiving portions 2c are pressed by insertion force of the disc cartridge 59, so that the guide projections 23 move to the upper end of the cam slots 5, and the sub chassis 2 moves upward to the top surface of the holder 3 while moving forward on the main chassis 1 against the tensile forces of the springs 28 to reach the loading position. At the loading position, the projection 2b of the sub chassis 2 moves within the opening 8 to press the abutment portion 10a of the auxiliary lever 10, so that the auxiliary lever 10 slightly rotates clockwise around the spindle 9, whereby the length of the spring 12 is extended from substantially the natural length L1 to L2, as shown in FIG. 29B. In addition, the first locking lever 15 rotates clockwise around the shaft 16, and its locking portion 15a is engaged with the stopper 2d of the sub chassis 2, whereby the sub chassis 2 is locked in the loading position. When the sub chassis 2 moves forward in the main chassis 1, the drive arm 19 is rotated by the control pin 47 provided on the bridge plate 71 and the regulation of the base 36 by the drive arm 19 is released, so that the carriage 30 can freely move along the guide shafts 34 and 35. When a large external force due to dropping, etc. is applied when the disk cartridge is in the loading position, the sub chassis 2 tries to move further forward against the holding force of the first locking lever 15. In this case, however, both step portions 2a of the sub chassis 2 come into abutment with the stopper pieces 7a of the mounting plates 7 fixed to the rear end of the main chassis 1, so that the forward movement of the sub chassis 2 is determined by the abutment position, whereby damage to the components mounted on the sub chassis 2 is prevented.

When the disc cartridge 59 is thus completely inserted into the holder 3, the disc cartridge is maintained in the upward position by the holder 3. However, the spindle motor 24 moves upward together with the sub chassis 2 to be engaged with a center hub (not shown) of the magnetic disc 61 accommodated in the disc cartridge 59. The magnetic disc 61 is rotated by driving the spindle motor 24, and the head transport mechanism 26 is also driven in accordance with the direction and magnitude of the current supplied to the exciting coils 41, whereby the carriage 30 is reciprocated in the radial direction of the magnetic disc 61 along the guide shafts 34 and 35. At this time, the position of the bottom surface of the arm 37 in relation to the drive pin 46 provided on the bridge plate 71 changes with the reciprocating movement of the carriage 30, and when the carriage 30 is on a retract position away from the magnetic disc 61, the drive pin 46 comes into abutment with the second flat portion 37c of the arm 37, and the upper magnetic head 39 separates from the magnetic disc 61, as shown in FIG. 22A. On the other hand, when the carriage 30 is moved toward the center of the magnetic disc 61, the drive pin 46 does not come into abutment with the arm 37, and the upper magnetic head 39 is pressed into contact with the lower magnetic head 40 with the magnetic disc 61 in between by the elastic urging force of the load spring 38, as shown in FIG. 22B, so that information of the magnetic disc 61 is recorded/reproduced by the magnetic heads 39 and 40.

In the case of ejecting the disc cartridge 59 from the apparatus, when the eject lever 4 is pressed against the spring 11 to operate forward movement, the removal portion 4c of the eject lever 4 presses the receiving portion 15b, and the first locking lever 15 rotates counterclockwise. When the first locking lever 15 rotates counterclockwise, the locking portion 15a is disengaged from the stopper 2d, and the sub chassis 2 moves downward while moving backward on the main chassis 1 in the opposite way to the above description, so that the disc cartridge 59 is ejected from the holder 3 by the receiving portions 2c of the sub chassis 2 and return force of the spring 51 and at the same time, the sub chassis 2 is locked in the unloading position again.

When the disc cartridge 59 is ejected, a large rotating force is exerted by the auxiliary lever 10 in the counterclockwise direction due to the extension of the spring 12 to the length L3 in accordance with the forward operation of the eject lever 4. Thus, when locking operation by the first locking lever 15 is released, the sub chassis 2 moves to the unloading position by the urging force of the springs 28 and the auxiliary lever 10.

In addition, at the time of ejecting the disc cartridge 59, the head transport mechanism 26 moves downward together with the sub chassis 2. However, since the downward movement of the arm 37 is regulated by the drive pin 46, the drive pin 46 comes into abutment with the first flat portion 37a of the arm 37, and both magnetic heads 39 and 40 separate from the magnetic disc 61, as shown in FIG. 22C. Therefore, the magnetic heads 39 and 40 do not strike against the disc cartridge 59 when the disc cartridge is ejected, whereby damage to the magnetic heads 39 and 40 can be prevented.

When the disc cartridge is inserted vigorously into the holder 3, the actuating pin 52 may bounce and be removed from the cutout 62a upon abutment with the shutter 62, so that the shutter 62 is not opened. In this case, when the disc cartridge 59 is further inserted into the holder 3, the detecting section 53b of the first rotating member 53 moves within the recess 60b of the cartridge case 60 without abutting with the shutter 62, so that the second rotating member 54 does not rotate and the abutment portion 54b remains in the insertion path of the disc cartridge 59. Therefore, the front surface of the cartridge case 60 comes into abutment with the abutment portion 54b before contact of the disc cartridge 59 with the magnetic heads 39 and 40, whereby further insertion of the disc cartridge 59 can be prevented.

An operation of the regulating member 58 will be described. In the course of insertion of the disc cartridge 59, when an operation is performed such that the detecting section 53b comes into abutment with the shutter 62, and the disc cartridge 59 is returned in the ejecting direction and is re-inserted after the detecting section 53b and the abutment portion 54d have been located in the recess 60b of the cartridge case 60, the regulating member 58 permits the operation. That is, with respect to the insertion direction of the disc cartridge 59, the timing is such that the detecting section 53b of the first rotating member 53 is rotated by the shutter 62 after the rotary portion 58b of the regulating member 58 has moved onto the recess 60, and the abutment portion 54d of the second rotating member 54 moves on the recess 60, so that the rotary portion 58b cannot be rotated on the recess 60b. Therefore, when the disc cartridge 59 is returned in the ejecting direction from the state shown in FIG. 30C, the detecting section 53b comes into abutment with the upper end of the shutter 62 contrary to the above description, and the abutting portion 54d starts to separate from the disc cartridge 59. However, the second rotating member 54 is maintained in the upward position by the rotary portion 58a until the rotary portion 58a moves on the recess 60b, and the front surface of the cartridge case 60 does not come into abutment with the abutment portion 54d even if the disc cartridge 59 is inserted again. In contrast, in the case where the regulating member 58 is not provided, when the disc cartridge 59 is returned in the ejecting direction in the course of insertion, the second rotating member 54 returns to its position in the insertion path of the disc cartridge 59 at the moment when the abutment portion 54d separates from the disc cartridge 59. Thus, even if the disc cartridge 59 is ready to be inserted again immediately thereafter, the insertion of the disc cartridge 59 is prevented by the abutment portion 54d although the shutter 62 is opened.

Figure 34:
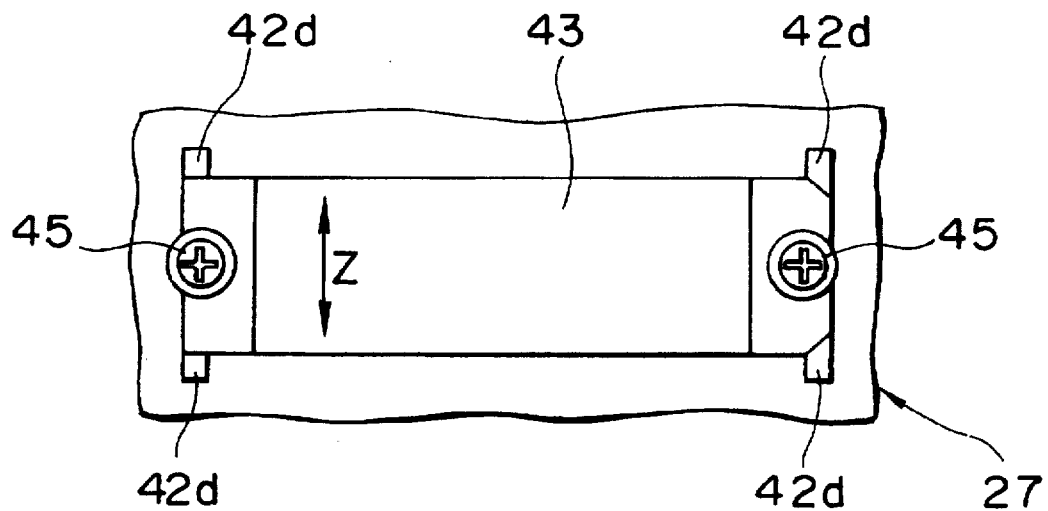
FIG. 34 is a sectional view of an essential portion according to a second embodiment of the disc drive apparatus of the present invention.
Figure 35:
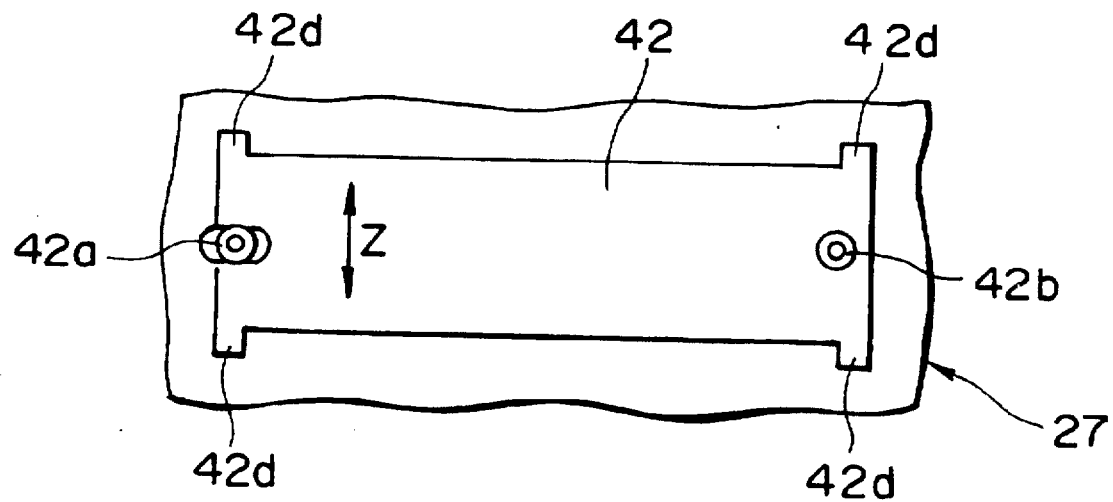
FIG. 35 is a plan view showing the disc drive apparatus of FIG. 34 from which the top yoke is removed.

FIGS. 34 and 35 show a second embodiment of the disc drive apparatus of the present invention. In this embodiment, the arrangement is such that projections 42d each projecting outward from the overlapping portion of the bottom yoke 42 and the top yoke 43 in the lateral direction Z are provided on both sides of the bottom yoke 42, and the projections 42d can be pressed by the jigs 70. Since other arrangements are the same as those of the first embodiment, the same components are indicated by the same reference numerals to omit the description.

Figure 36:
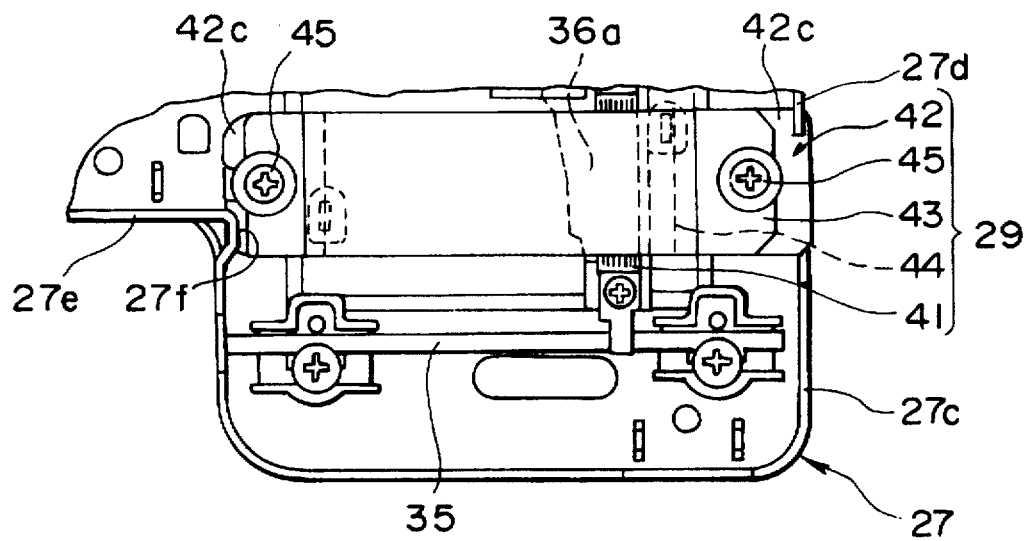
FIG. 36 is a plan view of an essential portion according to a third embodiment of the disc drive apparatus of the present invention.
Figure 37A:
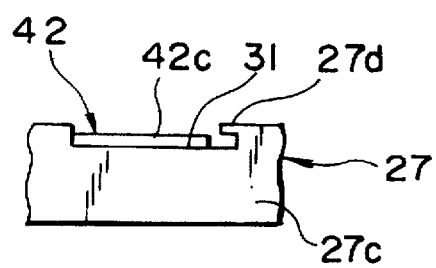
FIGS. 37A and 37B are side views each illustrating an assembly step of the bottom yoke in FIG. 36.
Figure 37B:
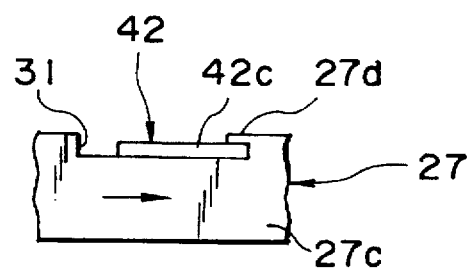

FIGS. 36 and 37 show a third embodiment of the disc drive apparatus of the present invention. In this embodiment, the arrangement is such that a locking portion 27d is provided on the rear end portion of the support plate 27 for covering a part of the guide groove 31 and for locking the top surface of the projection 42c provided on one end of the bottom yoke 42, and a locking portion 27f is provided on the side part 27e of the support plate 27 for locking the top surface of the projection 42c provided on the other end of the bottom yoke 42. In addition, the bottom yoke 42 and the top yoke 43 are assembled as follows. The bottom yoke 42 is inserted into the support plate 27 in a state where the bottom yoke 42 is adjusted to the guide groove 31, as shown in FIG. 37A. After the top surface of the projection 42c on the other end of the bottom yoke 42 has been locked with the locking portion 27f, the bottom yoke 42 is slid in the direction shown by the arrow, as shown in FIG. 37B, and the top surface of the projection 42c on one end of the bottom yoke 42 is locked with the locking portion 27d so as to assemble the top yoke 43 with the upward movement of the bottom yoke 42 prevented. The arrangement allows the bottom yoke 42 and the top yoke 43 to be assembled without using the jigs 70, thereby providing improved assembly.

It is appreciated that the protrusions 42c and 42d may be provided on one side of each bottom yoke 42, and either one of the locking portions 27d and 27f may be provided.

In one form of the invention, there is provided a head transport mechanism for a disc drive apparatus, including: guide shafts attached to a support plate, a carriage reciprocated along the guide shafts in a radial direction of a disc, exciting coils fixed to the carriage, bottom yokes inserted into the exciting coils, top yokes placed on the bottom yokes, magnets fixed to the top yokes, and set screws for securing the bottom yokes and top yokes to the support plate, wherein cylindrical projections are formed on the support plate, threads with which the set screws are threadedly engaged are cut on inner surfaces of the projections, and cutouts abutting with the projections are formed in one end of each of the bottom yokes. This feature of the invention offers the following advantage. Since the distal ends of the bottom yokes inserted into the exciting coils are located by the cylindrical projections, the bottom yokes and the top yokes can be easily secured to the support plate by screws, and damage to the exciting coils can be prevented.

In an another form of the invention there is provided a head transport mechanism for a disc drive apparatus, wherein rising walls are provided on the periphery of the support plate, and guide grooves for locating the other end of each of the bottom yokes are formed in the rising walls. This feature of the invention offers the following advantage. Since the cutouts can be brought into abutment with the projections while controlling transverse movements of the bottom yokes with the guide grooves, operation of inserting the bottom yokes into the exciting coils is further simplified.

In yet another form of the invention, there is provided a head transport mechanism for a disc drive apparatus, wherein the projections are integrally formed on the support plate. This feature of the invention offers the following advantage. The projections can be easily formed.

In a further form of the invention, there is provided a head transport mechanism for a disc drive apparatus, wherein protrusions protruding outward from overlapping portions of the bottom yokes and top yokes in a longitudinal and/or lateral direction of the bottom yokes are formed at least at one end of each of the bottom yokes. This feature of the invention offers the following advantage. When assembling the head transport mechanism, the top yokes can be assembled with the protrusions pressing, so that a head transport mechanism can be provided in which the bottom yokes do not move upward, and the exciting coils may not come into contact with the bottom yokes and be damaged.

In a still further form of the invention, there is provided a head transport mechanism for a disc drive apparatus, wherein the protrusions are provided on both ends of the bottom yokes. This feature of the invention offers the following advantages. Contact of the bottom yokes with the exciting coils can be securely prevented. A head transport mechanism having improved assembly and which more securely prevents damaged to the exciting coils can be provided.

In an another form of the invention, there is provided a head transport mechanism for a disc drive apparatus, wherein locking portions for locking the top surfaces of the protrusions are provided on the support plate. This feature of the invention offers the following advantages. The head transport mechanism can be assembled with the upward movement of the bottom yokes prevented and without using jigs. An inexpensive head transport mechanism having improved assembly, and causing no damage to the exciting coils can be provided.

In a further form of the invention, there is provided a head transport mechanism for a disc drive apparatus, wherein locking portions for locking the top surfaces of the protrusions are provided on the rear end portion and the side part of the support plate, and the protrusions provided on both ends of the bottom yokes are locked with the locking portions. This feature of the invention offers the following advantages. The upward movement of the bottom yokes at the time of assembling the head transport mechanism can be securely prevented. An inexpensive head transport mechanism can be provided having improved assembly, and more securely preventing damage to the exciting coils.

What is claimed is:

1. A head transport mechanism for a disc drive apparatus, comprising:

guide shafts attached to a support plate;

a carriage reciprocated along said guide shafts in a radial direction of a disc;

exciting coils fixed to said carriage;

bottom yokes inserted into said exciting coils;

top yokes placed on said bottom yokes;

magnets fixed to said top yokes; and set screws for securing said bottom yokes and top yokes to said support plate, wherein cylindrical projections are formed on said support plate, threads with which said set screws are threadedly engaged are cut on inner surfaces of said projections, and cutouts abutting with said projections are formed in one end of each of said bottom yokes.

2. A head transport mechanism for a disc drive apparatus according to claim 1, wherein rising walls are provided on the periphery of said support plate, and guide grooves for locating the other end of each of said bottom yokes are formed in said rising walls.

3. A head transport mechanism for a disc drive apparatus according to claim 1, wherein said projections are integrally formed on said support plate by burring.

4. A head transport mechanism for a disc drive apparatus, comprising:

guide shafts attached to a support plate;

a carriage reciprocated along said guide shafts in a radial direction of a disc;

exciting coils fixed to said carriage;

bottom yokes inserted into said exciting coils;

top yokes placed on said bottom yokes;

magnets fixed to said top yokes; and set screws for securing said bottom yokes and top yokes to said support plate, wherein, in the vicinity of said set screws for overlapping and securing said bottom yokes and said top yokes, protrusions protruding outward from overlapping portions in at least one of a longitudinal and a lateral directions of said bottom yokes are formed in at least one end of each of said bottom yokes.

5. A head transport mechanism for a disc drive apparatus according to claim 4, wherein said protrusions are provided on both ends of said bottom yokes.

6. A head transport mechanism for a disc drive apparatus according to claim 4, wherein locking portions for locking the top surfaces of said protrusions are provided on said support plate.

7. A head transport mechanism for a disc drive apparatus according to claim 5, wherein locking portions for locking the top surfaces of said protrusions are provided on the rear end portion and the side part of said support plate, and said protrusions provided on both ends of said bottom yokes are locked with said locking portions, respectively.

* * * * *